United States Patent
Mohanan et al.

(10) Patent No.: US 10,471,413 B2
(45) Date of Patent: Nov. 12, 2019

(54) EXHAUST GAS TREATMENT CATALYST

(71) Applicant: BASF CORPORATION, Florham Park, NJ (US)

(72) Inventors: Jaya L. Mohanan, Edison, NJ (US); Gary A. Gramiccioni, Madison, AL (US); John Hochmuth, Raritan, NJ (US); Kenneth E. Voss, Somerville, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 15/981,160

(22) Filed: May 16, 2018

(65) Prior Publication Data

US 2018/0297014 A1    Oct. 18, 2018

Related U.S. Application Data

(63) Continuation of application No. PCT/IB2016/056906, filed on Nov. 16, 2016.
(Continued)

(51) Int. Cl.
*B01D 53/94* (2006.01)
*B01J 23/10* (2006.01)
(Continued)

(52) U.S. Cl.
CPC .............. *B01J 23/10* (2013.01); *B01D 53/94* (2013.01); *B01D 53/9418* (2013.01);
(Continued)

(58) Field of Classification Search
CPC .......... B01D 53/9413; B01D 53/9418; B01D 2255/20715; B01D 2255/50;
(Continued)

(56) References Cited

U.S. PATENT DOCUMENTS

| 4,962,075 A | 10/1990 | Green et al. |
| 7,601,662 B2 | 10/2009 | Bull et al. |

(Continued)

FOREIGN PATENT DOCUMENTS

| CN | 105658328 A | * | 6/2016 | .............. B01J 37/03 |
| DE | 102007021471 A1 | * | 5/2007 | ......... B01D 39/2075 |

(Continued)

OTHER PUBLICATIONS

International Search Report and Written Opinion, PCT/IB2016/056906, dated Feb. 10, 2017.
(Continued)

*Primary Examiner* — Timothy C Vanoy
(74) *Attorney, Agent, or Firm* — Womble Bond Dickinson (US) LLP

(57) ABSTRACT

Described is a catalyst composition suitable for use as a selective catalytic reduction catalyst, including small-pore molecular sieve particles having a pore structure and a maximum ring size of eight tetrahedral atoms and impregnated with a promoter metal, and metal oxide particles dispersed within the small-pore molecular sieve particles and external to the pore structure of the small-pore molecular sieve particles, wherein the metal oxide particles include one or more oxides of a transition metal or lanthanide of Group 3 or Group 4 of the Periodic Table. A method for preparing the catalyst, a method for selectively reducing nitrogen oxides, and an exhaust gas treatment system are also described.

35 Claims, 16 Drawing Sheets

Related U.S. Application Data

(60) Provisional application No. 62/256,258, filed on Nov. 17, 2015.

(51) Int. Cl.
  *B01J 21/06* (2006.01)
  *B01J 21/04* (2006.01)
  *B01J 29/76* (2006.01)
  *B01J 35/00* (2006.01)
  *B01J 37/04* (2006.01)
  *B01J 37/02* (2006.01)
  *B01J 37/08* (2006.01)
  *F01N 3/20* (2006.01)
  *B01J 35/02* (2006.01)
  *B01J 35/04* (2006.01)

(52) U.S. Cl.
  CPC .............. *B01J 21/04* (2013.01); *B01J 21/066* (2013.01); *B01J 29/763* (2013.01); *B01J 35/0006* (2013.01); *B01J 35/0013* (2013.01); *B01J 35/0073* (2013.01); *B01J 35/026* (2013.01); *B01J 35/04* (2013.01); *B01J 37/0211* (2013.01); *B01J 37/0215* (2013.01); *B01J 37/0236* (2013.01); *B01J 37/0248* (2013.01); *B01J 37/04* (2013.01); *B01J 37/086* (2013.01); *F01N 3/20* (2013.01); *F01N 3/2066* (2013.01); *B01D 2251/2062* (2013.01); *B01D 2251/2067* (2013.01); *B01D 2255/206* (2013.01); *B01D 2255/2061* (2013.01); *B01D 2255/2065* (2013.01); *B01D 2255/2092* (2013.01); *B01D 2255/20715* (2013.01); *B01D 2255/20738* (2013.01); *B01D 2255/20761* (2013.01); *B01D 2255/50* (2013.01); *B01D 2255/9155* (2013.01); *B01D 2255/9202* (2013.01); *B01D 2255/9205* (2013.01); *Y02C 20/10* (2013.01)

(58) Field of Classification Search
  CPC ........ B01D 2255/905; B01D 2257/402; B01D 2257/404; B01D 2258/012; F01N 3/2066; F01N 237/04; F01N 2510/068; F01N 2570/14; F01N 2570/145
  See application file for complete search history.

(56) References Cited

U.S. PATENT DOCUMENTS

| | | | |
|---|---|---|---|
| 7,632,776 B2 * | 12/2009 | Miura | B01D 53/945 502/304 |
| 7,989,387 B2 * | 8/2011 | Miura | B01D 53/945 502/304 |
| 9,751,080 B2 * | 9/2017 | Fedeyko | B01J 29/74 |
| 10,076,748 B2 | 9/2018 | Morohishi et al. | |
| 10,105,649 B2 * | 10/2018 | Bull | B01D 53/9418 |
| 2005/0101473 A1 | 5/2005 | Marshall et al. | |
| 2006/0276331 A1 * | 12/2006 | Akamine | B01D 53/945 502/304 |
| 2008/0279741 A1 | 11/2008 | Golden et al. | |
| 2010/0069232 A1 * | 3/2010 | Takeshima | B01D 53/945 502/325 |
| 2011/0142737 A1 | 6/2011 | Seyler et al. | |
| 2015/0078989 A1 | 3/2015 | Fedeyko et al. | |
| 2015/0151288 A1 * | 6/2015 | Rivas-Cardona | B01J 37/0225 423/700 |
| 2015/0238944 A1 | 8/2015 | Narula et al. | |
| 2015/0258537 A1 | 9/2015 | Morohishi et al. | |
| 2017/0144105 A1 * | 5/2017 | Chandler | B01D 53/9418 |
| 2018/0339288 A1 * | 11/2018 | Petrovic | B01J 35/10 |

FOREIGN PATENT DOCUMENTS

| | | | | |
|---|---|---|---|---|
| EP | 1742733 B1 * | 5/2012 | ........... | B01D 53/945 |
| WO | 03-033118 A1 | 4/2003 | | |
| WO | WO 2015 075875 A1 * | 5/2015 | ............. | B01J 37/03 |
| WO | WO2015079804 A1 | 6/2015 | | |

OTHER PUBLICATIONS

Extended European Search Report for corresponding European application EP16865861.5, dated Jul. 1, 2019.

* cited by examiner

FIG. 10A-10D
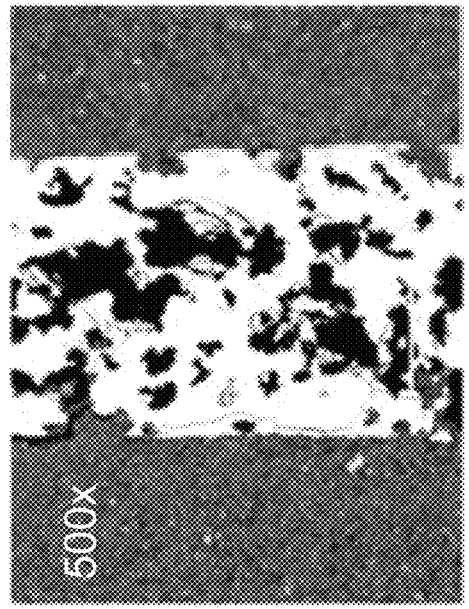
FIG. 10D
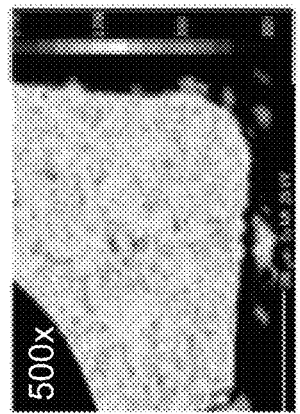
FIG. 10C
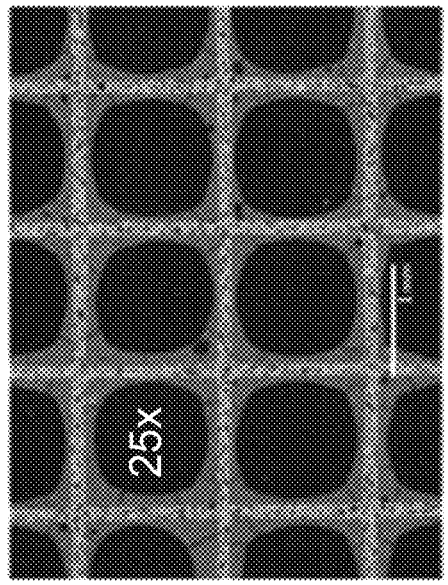
FIG. 10A
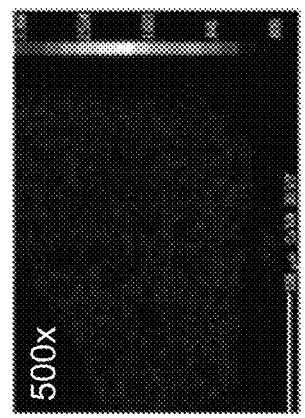
FIG. 10B

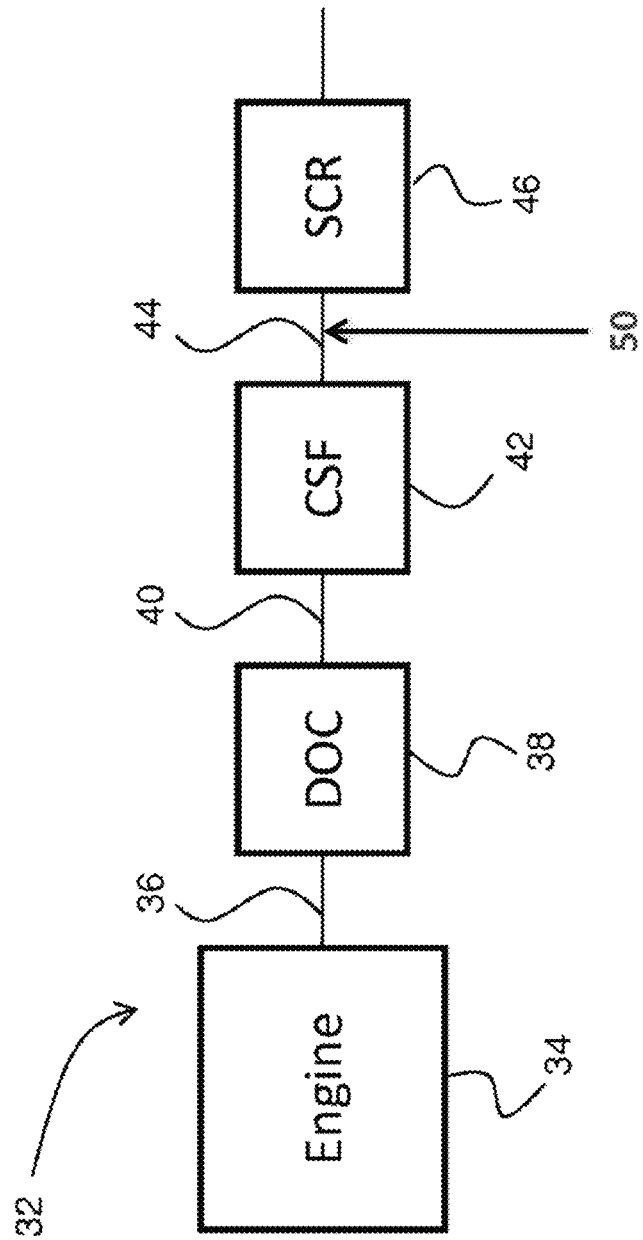

EXHAUST GAS TREATMENT CATALYST

CROSS-REFERENCE TO RELATED APPLICATIONS

This application is a continuation of International App. No. PCT/IB2016/056906; filed Nov. 16, 2016, which International Application was published by the International Bureau in English on May 26, 2017, and claims priority to U.S. Provisional Application No. 62/256,258, filed Nov. 17, 2015, each of which is incorporated by reference in their entirety and for all purposes.

TECHNICAL FIELD

The present invention is directed to an exhaust gas purifying catalyst, method of making the catalyst, and methods for its use. More particularly, the invention relates to selective catalytic reduction catalysts including a small-pore molecular sieve containing a promoter metal.

BACKGROUND

Over time, the harmful components of nitrogen oxides ($NO_x$) have led to atmospheric pollution. $NO_x$ is contained in exhaust gases such as from internal combustion engines (e.g., automobiles and trucks), from combustion installations (e.g., power stations heated by natural gas, oil, or coal), and from nitric acid production plants.

Various methods have been used in the treatment of $NO_x$-containing gas mixtures. One type of treatment involves catalytic reduction of nitrogen oxides. There are two processes: (1) a nonselective reduction process wherein carbon monoxide, hydrogen, or a lower hydrocarbon is used as a reducing agent, and (2) a selective reduction process wherein ammonia or ammonia precursor is used as a reducing agent. In the selective reduction process, a high degree of removal with nitrogen oxide can be obtained with a small amount of reducing agent.

The selective reduction process is referred to as a SCR process (Selective Catalytic Reduction). The SCR process uses catalytic reduction of nitrogen oxides with ammonia in the presence of atmospheric oxygen with the formation predominantly of nitrogen and steam:

$$4NO+4NH_3+O_2 \rightarrow 4N_2+6H_2O \quad \text{(standard SCR reaction)}$$

$$2NO_2+4NH_3 \rightarrow 3N_2+6H_2O \quad \text{(slow SCR reaction)}$$

$$NO+NO_2+NH_3 \rightarrow 2N_2+3H_2O \quad \text{(fast SCR reaction)}$$

Catalysts employed in the SCR process ideally should be able to retain good catalytic activity over the wide range of temperature conditions of use, for example, 200° C. to 600° C. or higher, under hydrothermal conditions. Hydrothermal conditions are often encountered in practice, such as during the regeneration of a soot filter, a component of the exhaust gas treatment system used for the removal of particles.

Molecular sieves such as zeolites have been used in the selective catalytic reduction (SCR) of nitrogen oxides with a reductant such as ammonia, urea, or a hydrocarbon in the presence of oxygen. Zeolites are crystalline materials having rather uniform pore sizes which, depending upon the type of zeolite and the type and amount of cations included in the zeolite lattice, range from about 3 to 10 Angstroms in diameter. Zeolites having 8-ring pore openings and double-six ring secondary building units, particularly those having cage-like structures, have recently found interest in use as SCR catalysts. A specific type of zeolite having these properties is chabazite (CHA), which is a small pore zeolite with 8 member-ring pore openings (~3.8 Angstroms) accessible through its 3-dimensional porosity. A cage like structure results from the connection of double six-ring building units by 4 rings.

Metal-promoted zeolite catalysts including, among others, iron-promoted and copper-promoted zeolite catalysts, for the selective catalytic reduction of nitrogen oxides with ammonia are known. Iron-promoted zeolite beta has been an effective commercial catalyst for the selective reduction of nitrogen oxides with ammonia. Unfortunately, it has been found that under harsh hydrothermal conditions, for example exhibited during the regeneration of a soot filter with temperatures locally exceeding 700° C., the activity of many metal-promoted zeolites begins to decline. This decline is often attributed to dealumination of the zeolite and the consequent loss of metal-containing active centers within the zeolite.

Metal-promoted, particularly copper promoted aluminosilicate zeolites having the CHA structure type have recently solicited a high degree of interest as catalysts for the SCR of oxides of nitrogen in lean burning engines using nitrogenous reductants. This is because of the wide temperature window coupled with the excellent hydrothermal durability of these materials, as described in U.S. Pat. No. 7,601,662. Prior to the discovery of metal promoted zeolites described in U.S. Pat. No. 7,601,662, while the literature had indicated that a large number of metal-promoted zeolites had been proposed in the patent and scientific literature for use as SCR catalysts, each of the proposed materials suffered from one or both of the following defects: (1) poor conversion of oxides of nitrogen at low temperatures, for example 350° C. and lower; and (2) poor hydrothermal stability marked by a significant decline in catalytic activity in the conversion of oxides of nitrogen by SCR. Thus, the invention described in U.S. Pat. No. 7,601,662 addressed a compelling, unsolved need to provide a material that would provide conversion of oxides of nitrogen at low temperatures and retention of SCR catalytic activity after hydrothermal aging at temperatures in excess of 650° C.

Even though the current catalysts exhibit excellent properties, there is a continuing desire to reduce $N_2O$ make during the SCR reaction. Accordingly, a catalyst is needed with improved $NO_x$ conversion efficiency and lower $N_2O$ make relative to the current technologies.

SUMMARY

The invention relates to a catalyst composition suitable for use as a selective catalytic reduction catalyst, comprising an intimate mixture of small-pore molecular sieve particles having a pore structure and a maximum ring size of eight tetrahedral atoms and impregnated with a promoter metal, and metal oxide particles comprising one or more oxides of a transition metal or lanthanide of Group 3 or Group 4 of the Periodic Table. It has been discovered that certain embodiments of a catalyst composition comprising molecular sieve particles with metal oxide particles dispersed therein (but external to the pore structure of the small-pore molecular sieve particles) can provide enhanced $NO_x$ reduction at low and/or high temperature, as well as reduced $N_2O$ make at low and/or high temperature, as compared to a conventional metal-promoted molecular sieve containing no metal oxide particles or containing only metal oxide derived from minimal amounts of certain binder materials. The metal oxide is typically present in an amount in the range of about 1 to about 15% by weight, on an oxide basis, based on the total weight of the washcoat.

The metal oxide particles typically comprise a metal oxide selected from the group consisting of zirconia, alumina, ceria, hafnia, yttria, and combinations thereof. In certain embodiments, the metal oxide particles have an average particle size in the range of about 10 nm to about 500 nm and/or a $D_{10}$ particle size greater than ten times larger than a pore opening of the molecular sieve. In one embodiment, the metal oxide particles have a $D_{10}$ particle size of about 10 nm or greater.

The catalyst composition can include a small-pore molecular sieve having a d6r unit. Exemplary small-pore molecular sieves have a structure type selected from AEI, AFT, AFX, CHA, EAB, ERI, KFI, LEV, LTN, MSO, SAS, SAT, SAV, SFW, and TSC. In one embodiment, the molecular size is SSZ-13.

The catalyst composition will typically include a promoter metal selected from the group consisting of Cu, Co, Ni, La, Mn, Fe, V, Ag, Ce, Nd, Pr, Ti, Cr, Zn, Zn, Nb, Mo, Hf, Y, W, and combinations thereof. In exemplary embodiments, the promoter metal comprises Cu or Fe or combinations thereof. A typical amount of promoter metal is about 1 to about 10% by weight, based on the total weight of the molecular sieve, such as about 2 to about 5% by weight. In another aspect, the invention provides a catalyst article comprising a substrate selected from a flow-through monolith, a wall-flow filter, a foam, or a mesh, wherein a catalyst composition according to any embodiment of the present disclosure is adhered as a washcoat layer on the substrate. In certain embodiments, the catalyst article of the invention is characterized by an $N_2O$ make that is at least 10% by weight lower (or at least 15% lower or at least 20% lower or more) as compared to a catalyst article comprising a washcoat with the same catalyst composition at the same loading but without metal oxide particles dispersed within the small-pore molecular sieve particles.

In yet another aspect, the invention provides a method for selectively reducing nitrogen oxides ($NO_x$), the method comprising contacting an exhaust gas stream containing $NO_x$ with a catalyst composition or catalyst article according to any embodiment of the present disclosure. In certain embodiments, the amount of $N_2O$ produced as a byproduct is reduced in the method of the invention as compared to processes practiced with certain conventional catalyst compositions and catalyst articles. For example, in one embodiment, the amount of $N_2O$ produced as a byproduct in the method of the invention is reduced compared to the amount of $N_2O$ produced in a method using a catalyst article comprising a washcoat with the same catalyst composition at the same loading but without metal oxide particles dispersed within the small-pore molecular sieve particles. In a still further aspect, the invention provides an exhaust gas treatment system comprising the catalyst composition or catalyst article according to any embodiment of the present disclosure downstream from an engine (e.g., a diesel engine or other lean burn engine) and an injector that adds a reductant to the exhaust gas stream.

The invention also provides a method of preparing a catalyst composition, the method comprising:

dissolving a salt of at least one promoter metal in an aqueous-based metal oxide sol, wherein the salt of the at least one promoter metal dissociates in the aqueous-based metal oxide sol to form an aqueous-based metal salt/metal oxide sol mixture, wherein the metal oxide particles comprise one or more oxides of a transition metal or lanthanide of Group 3 or Group 4 of the Periodic Table;

treating ammonium or proton exchanged small-pore molecular sieve particles having a pore structure and a maximum ring size of eight tetrahedral atoms with the aqueous-based metal salt/metal oxide sol mixture to allow impregnation of the promoter metal into the pore structure of the small-pore molecular sieve; and drying and calcining the treated small-pore molecular sieve particles to form the catalyst composition, wherein the catalyst composition comprises the small-pore molecular sieve particles impregnated with the promoter metal, and metal oxide particles dispersed within the small-pore molecular sieve particles and external to the pore structure of the small-pore molecular sieve particles. The promoter metal and molecular sieve can be selected as described in any embodiment herein.

The metal oxide sol can include any of the metal oxides noted above with respect to the catalyst composition and can exhibit the same particle size properties noted above. In certain embodiments, the metal oxide sol is selected from the group consisting of zirconyl hydroxide sols, nano-sized hydrous zirconia sols, alumina sols (e.g., large crystal, thermally stable boehmite sols), zirconia-yttria sols, zirconia-alumina sols, zirconia-ceria sols, organo-zirconium sols, and mixtures thereof. Advantageously, the metal oxide particles do not enter the pore structure of the small-pore molecular sieve during the method of preparation (i.e., the metal oxide particles are size-excluded from the pore structure of the molecular sieve).

The method can further include the steps of mixing the catalyst composition with water to form a washcoat slurry; applying the washcoat slurry to a substrate to form a washcoat coating thereon; and drying and calcining the substrate to form a catalytic article. In certain embodiments, the method includes adding a water soluble metal oxide compound (e.g., a zirconium compound) to the washcoat slurry to increase the total metal oxide content thereof.

The invention includes, without limitation, the following embodiments.

Embodiment 1

A catalyst composition suitable for use as a selective catalytic reduction catalyst, comprising: small-pore molecular sieve particles having a pore structure and a maximum ring size of eight tetrahedral atoms and impregnated with a promoter metal, and metal oxide particles dispersed within the small-pore molecular sieve particles and external to the pore structure of the small-pore molecular sieve particles, wherein the metal oxide particles comprise one or more oxides of a transition metal or lanthanide of Group 3 or Group 4 of the Periodic Table.

Embodiment 2

The catalyst composition of any preceding or subsequent embodiment, wherein the metal oxide particles comprise a metal oxide selected from the group consisting of zirconia, alumina, ceria, hafnia, yttria, and combinations thereof.

Embodiment 3

The catalyst composition of any preceding or subsequent embodiment, wherein the metal oxide particles comprise zirconia.

Embodiment 4

The catalyst composition of any preceding or subsequent embodiment, wherein the metal oxide particles have an average particle size in the range of about 10 nm to about 500 nm.

Embodiment 5

The catalyst composition of any preceding or subsequent embodiment, wherein the metal oxide particles have a $D_{10}$ particle size greater than ten times larger than a pore opening of the molecular sieve.

Embodiment 6

The catalyst composition of any preceding or subsequent embodiment, wherein the metal oxide particles have a $D_{10}$ particle size of about 10 nm or greater.

Embodiment 7

The catalyst composition of any preceding or subsequent embodiment, wherein the small-pore molecular sieve has a d6r unit.

Embodiment 8

The catalyst composition of any preceding or subsequent embodiment, wherein the small-pore molecular sieve has a structure type selected from AEI, AFT, AFX, CHA, EAB, ERI, KFI, LEV, LTN, MSO, SAS, SAT, SAV, SFW, and TSC.

Embodiment 9

The catalyst composition of any preceding or subsequent embodiment, wherein the promoter metal is selected from the group consisting of Cu, Co, Ni, La, Mn, Fe, V, Ag, Ce, Nd, Pr, Ti, Cr, Zn, Zn, Nb, Mo, Hf, Y, W, and combinations thereof.

Embodiment 10

The catalyst composition of any preceding or subsequent embodiment, wherein the small-pore molecular sieve has the CHA structure type.

Embodiment 11

The catalyst composition of any preceding or subsequent embodiment, wherein the promoter metal comprises Cu or Fe or combinations thereof.

Embodiment 12

The catalyst composition of any preceding or subsequent embodiment, wherein the promoter metal is present in an amount in the range of about 1 to about 10% by weight, based on the total weight of the molecular sieve.

Embodiment 13

The catalyst composition of any preceding or subsequent embodiment, wherein the promoter metal is present in an amount in the range of about 2 to about 5% by weight, based on the total weight of the molecular sieve.

Embodiment 14

The catalyst composition of any preceding or subsequent embodiment, wherein the metal oxide is present in an amount in the range of about 1 to about 15% by weight, on an oxide basis, based on the total weight of the washcoat.

Embodiment 15

A catalyst article comprising a substrate selected from a flow-through monolith, a wall-flow filter, a foam, or a mesh, wherein a catalyst composition according to any preceding or subsequent embodiment is adhered as a washcoat layer on the substrate.

Embodiment 16

The catalyst article of any preceding or subsequent embodiment, wherein the washcoat is disposed on a flow-through monolith or a wall-flow filter.

Embodiment 17

The catalyst article of any preceding or subsequent embodiment, wherein the catalyst article is characterized by an $N_2O$ make that is at least 10% by weight lower as compared to a catalyst article comprising a washcoat with the same catalyst composition at the same loading but without metal oxide particles dispersed within the small-pore molecular sieve particles.

Embodiment 18

A method for selectively reducing nitrogen oxides ($NO_x$), the method comprising contacting an exhaust gas stream containing $NO_x$ with the catalyst article of any preceding or subsequent embodiment.

Embodiment 19

The method of any preceding or subsequent embodiment, wherein the amount of $N_2O$ produced as a byproduct is reduced as compared to the amount of $N_2O$ produced in a method using a catalyst article comprising a washcoat with the same catalyst composition at the same loading but without metal oxide particles dispersed within the small-pore molecular sieve particles.

Embodiment 20

An exhaust gas treatment system comprising the catalyst article of any preceding or subsequent embodiment downstream from an engine and an injector that adds a reductant to the exhaust gas stream.

Embodiment 21

A method of preparing a catalyst composition, the method comprising:
dissolving a salt of at least one promoter metal in an aqueous-based metal oxide sol, wherein the salt of the at least one promoter metal dissociates in the aqueous-based metal oxide sol to form an aqueous-based metal salt/metal oxide sol mixture, wherein the metal oxide particles comprise one or more oxides of a transition metal or lanthanide of Group 3 or Group 4 of the Periodic Table;

treating ammonium or proton exchanged small-pore molecular sieve particles having a pore structure and a maximum ring size of eight tetrahedral atoms with the aqueous-based metal salt/metal oxide sol mixture to allow impregnation of the promoter metal into the pore structure of the small-pore molecular sieve; and drying and calcining the treated small-pore molecular sieve particles to form the catalyst composition, wherein the catalyst composition comprises the small-pore molecular sieve particles impregnated with the promoter metal, and metal oxide particles dispersed within the small-pore molecular sieve particles and external to the pore structure of the small-pore molecular sieve particles.

Embodiment 22

The method of any preceding or subsequent embodiment, wherein the metal oxide is selected from the group consisting of zirconia, alumina, ceria, hafnia, yttria, and combinations thereof.

Embodiment 23

The method of any preceding or subsequent embodiment, wherein the metal oxide comprises zirconia.

Embodiment 24

The method of any preceding or subsequent embodiment, wherein the metal oxide sol has an average particle size in the range of about 10 nm to about 500 nm.

Embodiment 25

The method of any preceding or subsequent embodiment, wherein the metal oxide sol has a $D_{10}$ particle size greater than ten times larger than a pore opening of the molecular sieve.

Embodiment 26

The method of any preceding or subsequent embodiment, wherein the metal oxide sol has a $D_{10}$ particle size of about 10 nm or greater.

Embodiment 27

The method of any preceding or subsequent embodiment, wherein the promoter metal is selected from the group consisting of Cu, Co, Ni, La, Mn, Fe, V, Ag, Ce, Nd, Pr, Ti, Cr, Zn, Zn, Nb, Mo, Hf, Y, W, and combinations thereof.

Embodiment 28

The method of any preceding or subsequent embodiment, wherein the metal oxide sol is selected from the group consisting of zirconyl hydroxide sols, nano-sized hydrous zirconia sols, alumina sols, zirconia-yttria sols, zirconia-alumina sols, zirconia-ceria sols, organo-zirconium sols, and mixtures thereof.

Embodiment 29

The method of any preceding or subsequent embodiment, wherein metal oxide particles do not enter the pore structure of the small-pore molecular sieve.

Embodiment 30

The method of any preceding or subsequent embodiment, wherein the small-pore molecular sieve has a d6r unit.

Embodiment 31

The method of any preceding or subsequent embodiment, wherein the small-pore molecular sieve has a structure type selected from AEI, AFT, AFX, CHA, EAB, ERI, KFI, LEV, LTN, MSO, SAS, SAT, SAV, SFW, and TSC.

Embodiment 32

The method of any preceding or subsequent embodiment, wherein the small-pore molecular sieve has the CHA crystal structure.

Embodiment 33

The method of any preceding or subsequent embodiment, wherein the promoter metal comprises Cu, Fe, or a combination thereof.

Embodiment 34

The method of any preceding or subsequent embodiment, further comprising the steps of mixing the catalyst composition with water to form a washcoat slurry; applying the washcoat slurry to a substrate to form a washcoat coating thereon; and drying and calcining the substrate to form a catalytic article.

Embodiment 35

The method of any preceding or subsequent embodiment, further comprising adding a water soluble metal oxide compound to the washcoat slurry to increase the total metal oxide content thereof.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise.

BRIEF DESCRIPTION OF DRAWINGS

FIGS. 10A-10D is a collection of SEM images of a catalyst material according to the Examples;

FIG. 16 shows a schematic depiction of an embodiment of an emission treatment system in which a catalyst composition of the present invention is utilized.

DETAILED DESCRIPTION

Figure 1:
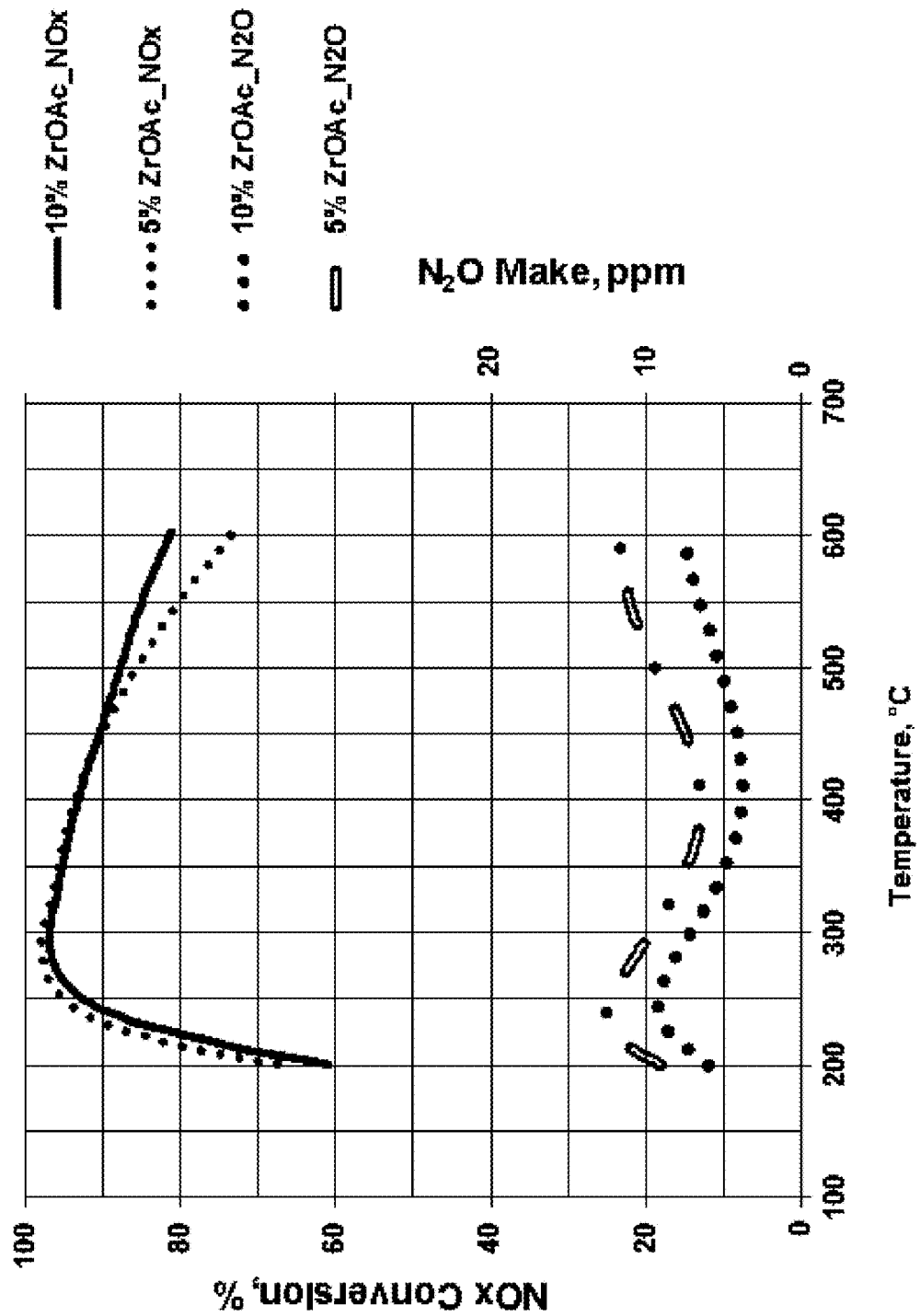
FIG. 1 is a graph of the $NO_x$ conversion and $N_2O$ make versus temperature of catalyst materials according to the Examples.

Before describing several exemplary embodiments of the invention, it is to be understood that the invention is not limited to the details of construction or process steps set forth in the following description. The invention is capable of other embodiments and of being practiced or being carried out in various ways.

Governmental regulations mandate the use of $NO_x$ reduction technologies for light and heavy-duty vehicles. Selective catalytic reduction (SCR) of $NO_x$ using urea is an effective and dominant emission control technology for $NO_x$ control. To meet governmental regulations, an SCR catalyst that has improved performance compared to the current Cu-SSZ-13 based benchmark technology is necessary. Provided is a catalyst having improved $NO_x$ conversion efficiency and lower $N_2O$ make relative to the current Cu-SSZ-13 based benchmark technologies in certain embodiments. The catalyst effectively promotes the reaction of ammonia with nitrogen oxides to form nitrogen and $H_2O$ selectively over a temperature range of 200 to 600° C.

Embodiments of the invention are directed to a selective catalytic reduction catalyst including a small-pore molecular sieve and a zirconia containing layer. Surprisingly, it was found that modification of a small-pore molecular sieve with zirconia resulted in lower $N_2O$ make and an improved low to high temperature performance window. In certain embodiments, the present invention provides a catalyst composition in the form of an intimate mixture of small-pore molecular sieve particles impregnated with a promoter metal and metal oxide (e.g., zirconia) particles. The metal oxide particles are sized so as to prevent any significant metal oxide particle penetration into the pore structure of the molecular sieve. Instead, the metal oxide particles essentially provide a surface coating on the molecular sieve particles. The presence of the metal oxide particles has been found to improve low temperature $NO_x$ reduction and reduce $N_2O$ make.

With respect to the terms used in this disclosure, the following definitions are provided.

As used herein, the term "catalyst" or "catalyst composition" or "catalyst material" refers to a material that promotes a reaction.

As used herein, the term "catalytic article" refers to an element that is used to promote a desired reaction. For example, a catalytic article may comprise a washcoat containing a catalytic species, e.g. a catalyst composition, on a substrate.

As used herein, the term "selective catalytic reduction" (SCR) refers to the catalytic process of reducing oxides of nitrogen to dinitrogen ($N_2$) using a nitrogenous reductant.

As used herein, the term "washcoat" has its usual meaning in the art of a thin, adherent coating of a catalytic or other material applied to a carrier substrate material, such as a honeycomb-type carrier member, which is sufficiently porous to permit the passage of the gas stream being treated. As is understood in the art, a washcoat is obtained from a dispersion of particles in a slurry, which is applied to a substrate, dried and calcined to provide the porous washcoat.

In one or more embodiments, a selective catalytic reduction catalyst comprises a washcoat including a small-pore molecular sieve having a pore structure and a maximum ring size of eight tetrahedral atoms and containing a promoter metal, and a zirconia containing layer on the small-pore molecular sieve containing the promoter metal, wherein the zirconia containing layer advantageously has particles of zirconia with a particle size in the range of about 10 nm to about 500 nm.

Molecular Sieves

As used herein, the phrase "molecular sieve" refers to framework materials such as zeolites and other framework materials (e.g. isomorphously substituted materials), which may in particulate form, and in combination with one or more promoter metals, be used as catalysts. Molecular sieves are materials based on an extensive three-dimensional network of oxygen ions containing generally tetrahedral type sites and having a substantially uniform pore distribution, with the average pore size being no larger than 20 Å. The pore sizes are defined by the ring size. As used herein, the term "zeolite" refers to a specific example of a molecular sieve, including silicon and aluminum atoms. According to one or more embodiments, it will be appreciated that by defining the molecular sieves by their structure type, it is intended to include the structure type and any and all isotypic framework materials such as SAPO, ALPO, and MeAPO materials having the same structure type as the zeolite materials.

In more specific embodiments, reference to an aluminosilicate zeolite structure type limits the material to molecular sieves that do not include phosphorus or other metals substituted in the framework. However, to be clear, as used herein, "aluminosilicate zeolite" excludes aluminophosphate materials such as SAPO, ALPO, and MeAPO materials, and the broader term "zeolite" is intended to include aluminosilicates and aluminophosphates. Zeolites are crystalline materials having rather uniform pore sizes which, depending upon the type of zeolite and the type and amount of cations included in the zeolite lattice, range from about 3 to 10 Angstroms in diameter. Zeolites generally comprise silica to alumina (SAR) molar ratios of 2 or greater.

The term "aluminophosphates" refers to another specific example of a molecular sieve, including aluminum and phosphate atoms. Aluminophosphates are crystalline materials having rather uniform pore sizes.

Aluminosilicates generally comprise open 3-dimensional framework structures composed of corner-sharing $TO_4$ tetrahedra, where T is Al or Si, or optionally P. Cations that balance the charge of the anionic framework are loosely associated with the framework oxygens, and the remaining pore volume is filled with water molecules. The non-framework cations are generally exchangeable, and the water molecules removable.

In one or more embodiments, the small-pore molecular sieve comprises $SiO_4/AlO_4$ tetrahedra and is linked by common oxygen atoms to form a three-dimensional network. In other embodiments, the molecular sieve component comprises $SiO_4/AlO_4/PO_4$ tetrahedra. The small-pore molecular sieve of one or more embodiments is differentiated mainly according to the geometry of the voids which are formed by the rigid network of the $(SiO_4)/AlO_4$, or $SiO_4/AlO_4/PO_4$, tetrahedra. The entrances to the voids are formed from 6, 8, 10, or 12 ring atoms with respect to the atoms which form the entrance opening. In one or more embodiments, the molecular sieve comprises ring sizes of no larger than 8, including 6 and 8.

According to one or more embodiments, the molecular sieve can be based on the framework topology by which the structures are identified. Typically, any structure type of zeolite can be used, such as structure types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EMT, EON, EPI, ERI, ESV, ETR, EUO, FAU, FER, FRA, GIS, GIU, GME, GON, GOO, HEU, IFR, IHW, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof.

In one or more embodiments, the molecular sieve comprises an 8-ring small pore aluminosilicate zeolite. As used herein, "small pore" refers to pore openings which are smaller than about 5 Angstroms, for example on the order of ~3.8 Angstroms. The phrase "8-ring" zeolites refers to zeolites having 8-ring pore openings and double-six ring secondary building units and having a cage like structure resulting from the connection of double six-ring building units by 4 rings. Zeolites are comprised of secondary building units (SBU) and composite building units (CBU), and appear in many different framework structures. Secondary building units contain up to 16 tetrahedral atoms and are non-chiral. Composite building units are not required to be achiral, and cannot necessarily be used to build the entire framework. For example, a group of zeolites have a single 4-ring (s4r) composite building unit in their framework structure. In the 4-ring, the "4" denotes the positions of tetrahedral silicon and aluminum atoms, and the oxygen atoms are located in between tetrahedral atoms. Other composite building units include, for example, a single 6-ring (s6r) unit, a double 4-ring (d4r) unit, and a double 6-ring (d6r) unit. The d4r unit is created by joining two s4r units. The d6r unit is created by joining two s6r units. In a d6r unit, there are twelve tetrahedral atoms. Zeolitic structure types that have a d6r secondary building unit include AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, and WEN.

In one or more embodiments, the molecular sieve is a small-pore molecular sieve having a pore structure and a maximum ring size of eight tetrahedral atoms. In other embodiments, the small-pore molecular sieve comprises a d6r unit. Thus, in one or more embodiments, the small-pore molecular sieve has a structure type selected from AEI, AFT, AFX, CHA, EAB, ERI, KFI, LEV, LTN, MSO, SAS, SAT, SAV, SFW, TSC, and combinations thereof. In other specific embodiments, the molecular sieve has a structure type selected from the group consisting of CHA, AEI, AFX, ERI, KFI, LEV, and combinations thereof. In still further specific embodiments, the small-pore molecular sieve has a structure type selected from CHA, AEI, and AFX. In one or more very specific embodiments, the small-pore molecular sieve component has the CHA structure type.

Zeolitic chabazite includes a naturally occurring tectosilicate mineral of a zeolite group with approximate formula: $(Ca,Na_2,K_2,Mg)Al_2Si_4O_{12}.6\ H_2O$ (e.g., hydrated calcium aluminum silicate). Three synthetic forms of zeolitic chabazite are described in "Zeolite Molecular Sieves," by D. W. Breck, published in 1973 by John Wiley & Sons, which is hereby incorporated by reference. The three synthetic forms reported by Breck are Zeolite K-G, described in J. Chem. Soc., p. 2822 (1956), Barrer et al; Zeolite D, described in British Patent No. 868,846 (1961); and Zeolite R, described in U.S. Pat. No. 3,030,181, which are hereby incorporated by reference. Synthesis of another synthetic form of zeolitic chabazite, SSZ-13, is described in U.S. Pat. No. 4,544,538, which is hereby incorporated by reference. Synthesis of a synthetic form of a molecular sieve having the chabazite crystal structure, silicoaluminophosphate 34 (SAPO-34), is described in U.S. Pat. Nos. 4,440,871 and 7,264,789, which are hereby incorporated by reference. A method of making yet another synthetic molecular sieve having chabazite structure, SAPO-44, is described in U.S. Pat. No. 6,162,415, which is hereby incorporated by reference.

In one or more embodiments, the molecular sieve can include all aluminosilicate, borosilicate, gallosilicate, MeAPSO, and MeAPO compositions. These include, but are not limited to SSZ-13, SSZ-62, natural chabazite, zeolite K-G, Linde D, Linde R, LZ-218, LZ-235. LZ-236, ZK-14, SAPO-34, SAPO-44, SAPO-47, ZYT-6, CuSAPO-34, CuSAPO-44, and CuSAPO-47.

The ratio of silica to alumina of an aluminosilicate molecular sieve can vary over a wide range. In one or more embodiments, the molecular sieve has a silica to alumina molar ratio (SAR) in the range of 2 to 300, including 5 to 250; 5 to 200; 5 to 100; and 5 to 50. In one or more specific embodiments, the molecular sieve has a silica to alumina molar ratio (SAR) in the range of 10 to 200, 10 to 100, 10 to 75, 10 to 60, and 10 to 50; 15 to 100, 15 to 75, 15 to 60, and 15 to 50; 20 to 100, 20 to 75, 20 to 60, and 20 to 50.

In one or more specific embodiments, the small-pore molecular sieve has the CHA structure type and has a silica-to-alumina ratio of from 2 to 300, including 5 to 250, 5 to 200, 5 to 100, and 5 to 50; 10 to 200, 10 to 100, 10 to 75, 10 to 60, and 10 to 50; 15 to 100, 15 to 75, 15 to 60, and 15 to 50; 20 to 100, 20 to 75, 20 to 60, and 20 to 50. In a specific embodiment, the small-pore molecular sieve comprises SSZ-13. In a very specific embodiment, the SSZ-13 has a silica-to-alumina ratio of from 2 to 300, including 5 to 250, 5 to 200, 5 to 100, and 5 to 50; 10 to 200, 10 to 100, 10 to 75, 10 to 60, and 10 to 50; 15 to 100, 15 to 75, 15 to 60, and 15 to 50; 20 to 100, 20 to 75, 20 to 60, and 20 to 50.

Synthesis of zeolites and related micro- and mesoporous materials varies according to the structure type of the zeolitic material, but typically involves the combination of several components (e.g. silica, alumina, phosphorous, alkali, organic template etc.) to form a synthesis gel, which is then hydrothermally crystallized to form a final product. The structure directing agent (SDA) can be in the form of an organic, i.e., tetraethylammonium hydroxide (TEAOH), or inorganic cation, i.e. $Na^+$ or $K^+$. During crystallization, the tetrahedral units organize around the SDA to form the desired framework, and the SDA is often embedded within the pore structure of the zeolite crystals. In one or more embodiments, the crystallization of the molecular sieve materials can be obtained by means of the addition of structure-directing agents/templates, crystal nuclei or elements. In some instances, the crystallization can be performed at temperatures of less than 100° C. A molecular sieve having the CHA structure may be prepared according to various techniques known in the art, for example U.S. Pat. No. 4,544,538 (Zones) and U.S. Pat. No. 6,709,644 (Zones), which are herein incorporated by reference in their entireties.

Optionally, the obtained alkali metal zeolite is $NH_4$-exchanged to form $NH_4$—Chabazite. The $NH_4$-ion exchange can be carried out according to various techniques known in the art, for example Bleken, F.; Bjorgen, M.; Palumbo, L.; Bordiga, S.; Svelle, S.; Lillerud, K.-P.; and Olsbye, U. Topics in Catalysis 52, (2009), 218-228.

Promoter Metal

As used herein, "promoted" refers to a component that is intentionally added to the molecular sieve, as opposed to impurities inherent in the molecular sieve. Thus, a promoter is intentionally added to enhance activity of a catalyst compared to a catalyst that does not have promoter intentionally added. In order to promote the SCR of oxides of nitrogen, in one or more embodiments, a suitable metal is exchanged into the molecular sieve component. Accordingly, the molecular sieve of one or more embodiments may be subsequently ion-exchanged with one or more promoter metals such as copper (Cu), cobalt (Co), nickel (Ni), lanthanum (La), manganese (Mn), iron (Fe), vanadium (V), silver (Ag), and cerium (Ce), neodymium (Nd), praseodymium (Pr), titanium (Ti), chromium (Cr), zinc (Zn), tin (Sn), niobium (Nb), molybdenum (Mo), hafnium (Hf), yttrium (Y), and tungsten (W). In specific embodiments, the molecular sieve component is promoted with Cu, Fe, and combinations thereof. In very specific embodiments, the molecular sieve component is promoted with Cu.

The promoter metal content of the molecular sieve component, calculated as the oxide, is, in one or more embodiments, at least about 0.1 wt. %, reported on a volatile-free basis. In one or more embodiments, the promoter metal is present in an amount in the range of about 1 to about 10% by weight, including the range of about 2 to about 5% by weight, in all cases, based on the total weight of the molecular sieve. In one or more specific embodiments, the promoter metal comprises Cu, and the Cu content, calculated as CuO is in the range of up to about 10 wt. %, including 9, 8, 7, 6, 5, 4, 3, 2, 1, 0.5, and 0.1 wt. %, on an oxide basis, in each case based on the total weight of the calcined molecular sieve component and reported on a volatile free basis. In specific embodiments, the Cu content, calculated as CuO, is in the range of about 2 to about 5 wt. %.

Metal Oxide on the Surface of the Molecular Sieve

According to one or more embodiments, the catalyst composition includes molecular sieve contains a promoter metal and a metal oxide on the surface of the molecular sieve. The metal oxide is in intimate mixture with the molecular sieve so as to provide a dispersed metal oxide phase within the molecular sieve material. In certain embodiments, the dispersion of the metal oxide throughout the molecular sieve material can be relatively uniform. However, in some embodiments, at least a portion of the metal oxide can be found in an enriched region at the surface of a washcoat layer containing the catalyst composition of the invention, usually as a result of an amount of water soluble zirconium compound (or other metal oxide compound) that migrates to the washcoat layer surface and is decomposed/oxidized in air during the substrate coating process.

For the sake of ease of reference, much of the present disclosure focuses on zirconium oxide (and related zirconium precursors). However, other metal oxides can be used without departing from the invention, such as metal oxides comprising one or more oxides of a transition metal or lanthanide of Group 3 or Group 4 of the Periodic Table. Specific examples include zirconia, alumina, ceria, hafnia, yttria, and combinations thereof, although minor amounts of other metal oxides could also be present. In certain embodiments, the predominant (greater than 50% by weight based on total metal oxide weight) metal oxide is zirconia, alumina, ceria, hafnia, yttria, or a combination thereof. In certain advantageous embodiments, the metal oxide is predominantly zirconia, including composites of zirconia with other metal oxides such as ceria, alumina, hafnia, or yttria. In other embodiments, the metal oxide is alumina, such as large crystal boehmite materials such as boehmite having a crystallite size of about 20 nm or higher.

In certain embodiments, the metal oxide content of the catalyst composition is provided, at least in part, by the mixture of a metal oxide sol containing microparticles or nanoparticles of the metal oxide with the molecular sieve. Introduction of the metal oxide material in a relatively insoluble form, as opposed to use of water soluble precursors that are later calcined into oxide form, can aid in prevention of promoter metal migration within the catalyst composition, which can be detrimental to high temperature $NO_x$ reduction. Thus, the benefits of increased metal oxide content (reduced $N_2O$ make and enhanced low temperature $NO_x$ reduction) can be achieved without negatively impacting high temperature performance.

For example, in some embodiments, the zirconia is introduced using an aqueous-based zirconia sol. As used herein, the term "aqueous-based zirconia sol" refers to a colloidal suspension of small, solid particles of zirconia or hydrous zirconia in a continuous liquid (water) medium. In one or more embodiments, the aqueous-based zirconia sol is selected from the group consisting of zirconyl hydroxide sols, nano-sized hydrous zirconia sols, zirconia-yttria sols, zirconia-alumina sols, zirconia-ceria sol, organo-zirconium sols, and mixtures thereof. As noted herein, an aqueous-based alumina sol, such as a large crystal boehmite sol, could also be used in certain embodiments.

In some embodiments, the aqueous-based zirconia sol may include one or more promoter metals in the form of an aqueous-based metal salt. In other words, the molecular sieve can be impregnated with a promoter metal and mixed with metal oxide particles in the same treatment step. As used herein, "promoted" refers to a component that is intentionally added to the aqueous-based zirconia sol, as opposed to impurities inherent in the aqueous-based zirconia sol. Thus, a promoter is intentionally added to enhance activity of the aqueous-based zirconia sol compared to an aqueous-based zirconia sol that does not have promoter intentionally added. In one or more embodiments, the aqueous-based zirconia sol includes a promoter metal selected from the group consisting of lanthanum (La), cerium (Ce), neodymium (Nd), praseodymium (Pr), copper (Cu), manganese (Mn), iron (Fe), nickel (Ni), titanium (Ti), chromium (Cr), zinc (Zn), tin (Sn), vanadium (V), niobium (Nb), molybdenum (Mo), hafnium (Hf), tungsten (W), yttrium (Y), and combinations thereof.

In one or more embodiments, the zirconium sol (or other metal oxide sol) referenced herein has particles of zirconia (or other metal oxide) with an average particle size in the range of about 10 nm to about 500 nm, including about 10 nm to about 400 nm, about 10 nm to about 300 nm, and about 10 nm to about 250 nm. As used herein, the term "average particle size" refers to the average diameter of the zirconia particles (or other metal oxide particles) as measured by CILAS 1064 Laser Particle Size Analyzer, according to the manufacturer's recommended liquid mode method with a measurement range of 0.04 to 500 microns. The particle sizes of nano-sized sol component can be measured using CILAS 1064 Laser Particle Size Analyzer according to the manufacturer's recommended liquid mode method with a measurement range of 0.04 to 500 microns. For particles <40 nm, such particle sizes can be measured using Malvern Zetasizer Nano ZS, which is a high performance two angle particle and molecular size analyzer for the enhanced detection of aggregates and measurement of small or dilute samples, and samples at very low or high concentration using dynamic light scattering with "NIBS" optics.

In one or more embodiments, the molecular sieve and the particles of zirconia (or other metal oxide) have an average or mean particle size distribution ratio of greater than about 10:1, including greater than about 100:1, greater than about 1000:1, greater than about 10,000:1. As used herein, the terms "average particle size distribution ratio" and "mean particle size distribution ratio" refer to $D_{50}$ (50%=value).

Without intending to be bound by theory, it is thought that the zirconia (or other metal oxide) should advantageously contain nano-sized particles, which are sized such that the $D_{10}$ value is greater than ten times (10×) that of the pore opening of the zeolite such that the particles will not penetrate the pores of the small pore molecular sieve. In one or more embodiments, the particles of zirconia (and/or the particles of zirconia in the starting zirconia sol) have a $D_{10}$ particle size that is more than ten times larger than a pore opening of the small-pore molecular sieve. Reference to $D_{10}$ particle size means a particle distribution having 10% by weight of particles with a diameter below the given threshold. In certain embodiments, the particles of zirconia have a $D_{10}$ value of about 10 nm or greater, about 15 nm or greater, or about 20 nm or greater.

Surprisingly, it was found that the presence of zirconia reduces $N_2O$ make. In one or more embodiments, for certain catalyst articles of the invention, $N_2O$ make is reduced by more than about 10% by weight, including more than about 15%, more than about 20%, more than about 25%, more than about 30%, more than about 35%, and more than about 40%, when compared to a catalyst article comprising a washcoat including the same small-pore molecular sieve/promoter metal (at the same catalyst and promoter metal loading), but which does not comprise a zirconia containing layer. Exemplary test conditions for determining $N_2O$ make can be found in Example 3.

In one or more embodiments, the zirconia (or other metal oxide) is present in an amount in a range of about 1 to about 20% by weight, including about 1%, about 2%, about 3%, about 4%, about 5%, about 6%, about 7%, about 8%, about 9%, about 10%, about 11%, about 12%, about 13%, about 14%, and about 15% by weight, on an oxide basis, in all cases based on the total weight of the washcoat. As used herein, the term "total weight of the washcoat" means the weight of all of the components in the washcoat, including the molecular sieve, the promoter metal, and the zirconia, after the washcoat has been dried and calcined. In certain embodiments, the zirconia (or other metal oxide) is present in an amount of at least about 5% by weight, at least about 6%, at least about 7%, at least about 8%, at least about 9%, or at least about 10%, based on the total weight of the washcoat.

In certain embodiments, the metal oxide content is supplemented through use of a water soluble metal oxide precursor added to the washcoat slurry during the washcoating process. In one embodiment, the entirety of the metal oxide is provided in this manner, although it is advantageous for at least some of the metal oxide content to be derived from a relatively insoluble source as described above. As noted in the examples, use of large amounts of water soluble metal oxide precursor may contribute to undesirable promoter metal migration within a washcoat. Accordingly, it is desirable to either minimize the contribution of water soluble metal oxide precursors to the overall metal oxide content and/or calcine the metal-promoted molecular sieve material (e.g., calcination in air at a temperature of at least about 300° C.) before contact with the water soluble metal oxide precursor to minimize promoter metal solubility.

A washcoat slurry is typically prepared using copious amounts of water, and, thus, an aqueous based washcoat slurry is typically used as well. The zirconium compounds that migrate to the washcoat surface are soluble in water and must also then be soluble in the slurry. In one or more embodiments, the zirconium compound is at least 15% by weight soluble in water, including at least about 20% soluble, at least about 30% soluble, at least about 40% soluble, at least about 50% soluble, at least about 60% soluble, at least about 70% soluble, at least about 80% soluble, and at least about 90% soluble. In other embodiments, the zirconium compound has a water solubility in the range of about 15 to about 100% soluble, including about 15 to about 85%, about 20 to about 100%, about 20 to about 85%, about 30 to about 100%, about 30 to about 85%, about 40 to about 100%, about 40 to about 85%, about 50 to about 100%, and about 50 to about 85% soluble. Reference to solubility in terms of weight percentage refers to the percentage of zirconium compound dissolved in an aqueous washcoat composition at room temperature (25° C.) and 1 atm.

As used herein, "water soluble zirconia component," "water soluble zirconium compound," and the like refers to the respective water soluble zirconium-containing compound, complex, precursor, or the like which, upon calcination or use of the catalyst, decomposes, oxidizes, or otherwise converts to a catalytically active form, usually, the metal or the metal oxide (i.e., zirconia). As noted above, water soluble precursors of other metal oxides could be used instead of zirconium compounds.

In one or more embodiments, a salt, such as e.g. $NH_4NO_3$ or $NH_4OAc$, is added to the aqueous washcoat composition containing the zirconium compound in order to increase ionic strength. The pH is then adjusted/controlled, e.g. pH ~4-5, in order to ensure the zirconium compound such as a zirconyl salt, e.g. zirconyl acetate, is water soluble and will migrate during drying.

In one or more embodiments, the zirconium compound is selected from the group consisting of ionic zirconium salts, covalently bonded organo-zirconium complexes, covalently bonded organo-zirconyl compounds, and mixtures thereof. As used herein, there term "organo-zirconium salt, compound, or complex" refers to $Zr^{4+}$ with any anionic organic ligand covalently bonded to form a complex, and which can also include polymeric species. In one or more embodiments, the water soluble zirconium compound is selected from the group consisting of zirconium acetate, zirconium citrate, zirconium tartrate, zirconium lactate, zirconium adipate, and mixtures thereof. As used herein, the term "organo-zirconyl salt, compound, or complex" refers to $ZrO^{2+}$ with any anionic organic ligand ionically bonded to form a complex, which can also include polymeric species. In one or more embodiments, the water soluble zirconium compound is selected from the group consisting of zirconium nitrate, zirconium chloride, zirconium sulfate, zirconyl nitrate, zirconyl chloride, zirconyl sulfate, zirconyl acetate, zirconyl citrate, zirconyl tartrate, zirconyl lactate, zirconyl adipate, and mixtures thereof.

Particle Shape and Size

The catalyst according to embodiments of the invention may be provided in the form of a powder or a sprayed material from separation techniques including decantation, filtration, centrifugation, or spraying.

In general, the powder or sprayed material can be shaped without any other compounds, e.g. by suitable compacting, to obtain moldings of a desired geometry, e.g. tablets, cylinders, spheres, or the like.

By way of example, the powder or sprayed material is admixed with or coated by suitable modifiers well known in the art. By way of example, modifiers such as silica, alumina, zeolites or refractory binders (for example a zirconium precursor) may be used. The powder or the sprayed material, optionally after admixing or coating by suitable modifiers, may be formed into a slurry, for example with water, which is deposited upon a suitable refractory carrier, for example, a flow through honeycomb substrate carrier or a wall flow honeycomb substrate carrier.

The catalyst according to embodiments of the invention may also be provided in the form of extrudates, pellets, tablets, or particles of any other suitable shape, for use as a packed bed of particulate catalyst, or as shaped pieces such as plates, saddles, tubes, or the like.

SCR Activity

In one or more embodiments, a coated substrate comprising the selective catalytic reduction catalyst of one or more embodiments exhibits an aged $NO_x$ conversion at 200° C. of at least 50% measured at a gas hourly space velocity of 80000 $h^{-1}$. In specific embodiments the catalyst exhibits an aged $NO_x$ conversion at 450° C. of at least 70% measured at a gas hourly space velocity of 80000 $h^{-1}$. More specifically the aged $NO_x$ conversion at 200° C. is at least 55% and at 450° C. at least 75%, even more specifically the aged $NO_x$ conversion at 200° C. is at least 60% and at 450° C. at least 80%, measured at a gas hourly volume-based space velocity of 80000 $h^{-1}$ under steady state conditions at maximum $NH_3$-slip conditions in a gas mixture of 500 ppm NO, 500 ppm $NH_3$, 10% $O_2$, 5% $H_2O$, balance $N_2$. The coated substrates or "cores" were hydrothermally aged in a tube furnace in a gas flow containing 10% $H_2O$, 10% $O_2$, balance $N_2$ at a space velocity of 4,000 $h^{-1}$ for 5 h at 750° C.

The SCR activity measurement has been demonstrated in the literature, see, for example PCT Application Publication No. WO 2008/106519.

Furthermore, according to one or more embodiments, the catalyst is effective to lower $N_2O$ make.

The Substrate

In one or more embodiments, the catalyst composition can be applied to a substrate as a washcoat. As used herein, the term "substrate" refers to the monolithic material onto which the catalyst is placed, typically in the form of a washcoat. A washcoat is formed by preparing a slurry containing a certain solids content (e.g., 30-90% by weight) of catalyst in a liquid vehicle, which is then coated onto a substrate and dried to provide a washcoat layer.

In one or more embodiments, the substrate is selected from one or more of a flow-through honeycomb monolith, a wall-flow filter, a foam, or a mesh, and the catalyst is applied to the substrate as a washcoat.

According to one or more embodiments, the substrate for the catalyst composition may be constructed of any material typically used for preparing automotive catalysts and will typically comprise a metal or ceramic honeycomb structure. The substrate typically provides a plurality of wall surfaces upon which the catalyst composition is applied and adhered, thereby acting as a carrier for the catalyst composition.

Exemplary metallic substrates include heat resistant metals and metal alloys, such as titanium and stainless steel as well as other alloys in which iron is a substantial or major component. Such alloys may contain one or more of nickel, chromium, and/or aluminum, and the total amount of these metals may advantageously comprise at least 15 wt. % of the alloy, e.g., 10-25 wt. % of chromium, 3-8 wt. % of aluminum, and up to 20 wt. % of nickel. The alloys may also contain small or trace amounts of one or more other metals, such as manganese, copper, vanadium, titanium and the like. The surface or the metal carriers may be oxidized at high temperatures, e.g., 1000° C. and higher, to form an oxide layer on the surface of the substrate, improving the corrosion resistance of the alloy and facilitating adhesion of the washcoat layer to the metal surface.

Ceramic materials used to construct the substrate may include any suitable refractory material, e.g., cordierite, mullite, cordierite-α alumina, silicon nitride, zircon mullite, spodumene, alumina-silica magnesia, zircon silicate, sillimanite, magnesium silicates, zircon, petalite, a alumina, aluminosilicates and the like.

Any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material. The flow passages of the monolithic substrate are thin-walled channels which can be of any suitable cross-sectional shape, such as trapezoidal, rectangular, square, sinusoidal, hexagonal, oval, circular, and the like. Such structures may contain from about 60 to about 1200 or more gas inlet openings (i.e., "cells") per square inch of cross section (cpsi), more usually from about 300 to 600 cpsi. The wall thickness of flow-through substrates can vary, with a typical range being between 0.002 and 0.1 inches. A representative commercially-available flow-through substrate is a cordierite substrate having 400 cpsi and a wall thickness of 6 mil, or 600 cpsi and a wall thickness of 4 mil. However, it will be understood that the invention is not limited to a particular substrate type, material, or geometry.

In alternative embodiments, the substrate may be a wall-flow substrate, wherein each passage is blocked at one end of the substrate body with a non-porous plug, with alternate passages blocked at opposite end-faces. This requires that gas flow through the porous walls of the wall-flow substrate to reach the exit. Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 45-65%. Other ceramic materials such as aluminum-titanate, silicon carbide and silicon nitride are also used a wall-flow filter substrates. However, it will be understood that the invention is not limited to a particular substrate type, material, or geometry. Note that where the substrate is a wall-flow substrate, the DOC composition can permeate into the pore structure of the porous walls (i.e., partially or fully occluding the pore openings) in addition to being disposed on the surface of the walls.

Figure 15:
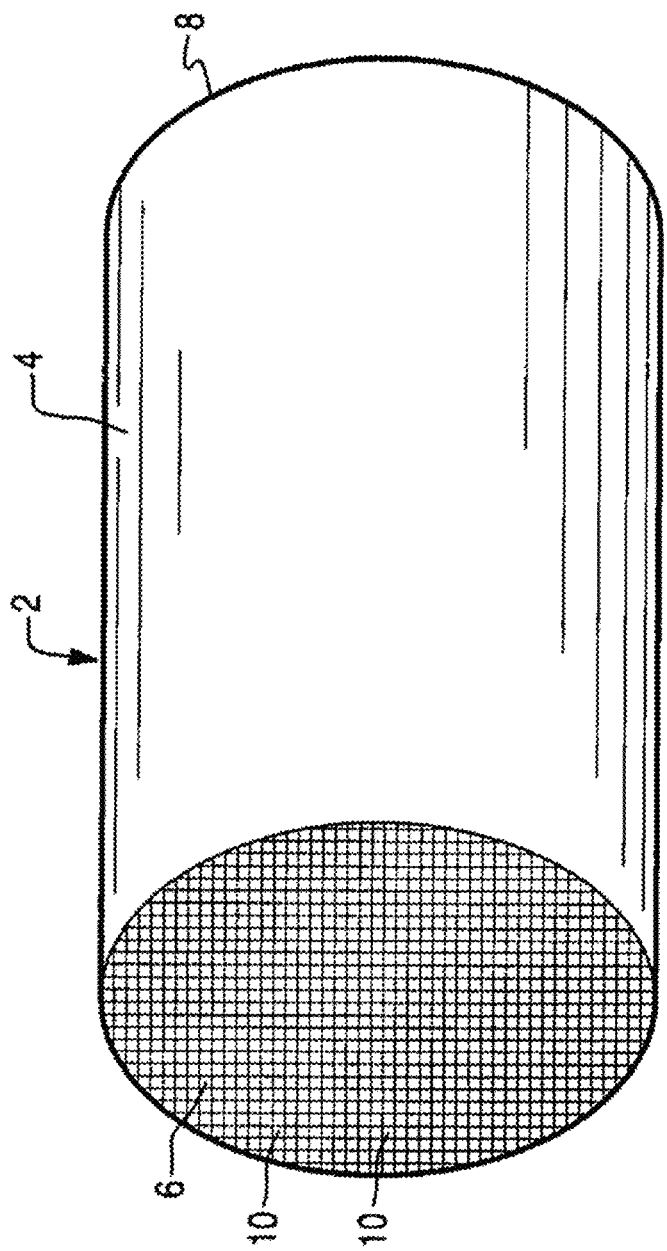
FIG. 15 is a perspective view of a honeycomb-type substrate carrier which may comprise a catalyst composition in accordance with the present invention.

FIG. 15 illustrates an exemplary substrate 2 in the form of a honeycomb monolith coated with a catalyst composition as described herein. The exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. In the case of a flow-through monolith, the passages 10 are typically unobstructed so as to permit the flow of a fluid, e.g., a gas stream, longitudinally through carrier 2 via gas flow passages 10 thereof. Alternatively, the substrate 2 can be in the form of a wall-flow filter as discussed in detail above. In such an embodiment, each gas flow passage 10 is blocked at either the inlet or outlet end and the walls of the passages are porous to allow gas to travel from one gas flow passage into an adjacent gas flow passage, as would be understood in the art. If desired, the catalyst composition can be applied in multiple, distinct layers. The present invention can be practiced with one or more (e.g., 2, 3, or 4) washcoat layers.

To coat the substrates with the catalyst of one or more embodiments, the substrates are immersed vertically in a portion of the catalyst slurry such that the top of the substrate is located just above the surface of the slurry. In this manner slurry contacts the inlet face of each honeycomb wall, but is prevented from contacting the outlet face of each wall. The sample is left in the slurry for about 30 seconds. The substrate is removed from the slurry, and excess slurry is removed from the substrate first by allowing it to drain from the channels, then by blowing with compressed air (against the direction of slurry penetration), and then by pulling a vacuum from the direction of slurry penetration. By using this technique, in the case of a wall-flow substrate, the catalyst slurry permeates the walls of the substrate, yet the pores are not occluded to the extent that undue back pressure will build up in the finished substrate. As used herein, the term "permeate" when used to describe the dispersion of the catalyst slurry on the substrate, means that the catalyst composition is dispersed throughout the wall of the substrate and, thus, at least partially occlude the pores in the wall.

The coated substrates are dried typically at about 100° C. and calcined at a higher temperature (e.g., 300 to 450° C.). After calcining, the catalyst loading can be determined through calculation of the coated and uncoated weights of the substrate. As will be apparent to those of skill in the art, the catalyst loading can be modified by altering the solids content of the coating slurry. Alternatively, repeated immersions of the substrate in the coating slurry can be conducted, followed by removal of the excess slurry as described above.

Preparation of Catalyst

According to one or more embodiments, methods for the synthesis of selective catalytic reduction catalysts are provided. More particularly, the catalyst comprises a small-pore molecular sieve having a pore structure and a maximum ring size of eight tetrahedral atoms and containing a promoter metal, and a zirconia containing layer on the small-pore molecular sieve containing the promoter metal, wherein the zirconia containing layer typically has particles of zirconia with an average particle size in the range of about 10 nm to about 500 nm.

For ease of reference, the foregoing description focuses on the use of a zirconia sol. However, it is understood that other metal oxide sols could be used without departing from the invention. In one embodiment, the catalyst can be prepared by dissolving a metal salt (e.g., a nitrate or acetate salt) in an aqueous-based zirconia sol, such as, but not limited to, colloidal zirconyl hydroxide. In one or more embodiments, the metal salt is a salt of at least one metal selected from the group consisting of La, Ce, Nd, Pr, Cu, Mn, Fe, Ni, Ti, Cr, Zn, Sn, V, Nb, Mo, Hf, Y, and W. The metal salt dissolves and dissociates in the aqueous-based zirconia sol to form a soluble aqueous-based metal salt/zirconia sol mixture. Exemplary metal salts include copper (II) nitrate, copper (II) acetate, iron (III) nitrate, and iron (III) acetate. The aqueous-based zirconia sol has particles of zirconia with an average particle size in the range of about 10 nm to about 500 nm. An aqueous-based metal salt (i.e. promoter metal salt)/zirconia sol mixture is formed, having a concentration of about 50 to 100% incipient wetness. In one or more embodiments, a higher incipient wetness, particularly approaching 100% is desired.

Subsequently, an ammonium or proton exchanged molecular sieve is impregnated with the metal salt/zirconia-based sol mixture. Impregnation can occur in any of various mixers known in the art for mixing a powder with a solution or a dispersion, such as a ribbon mixer or a planetary mixer equipped with a nozzle for spraying a liquid into the mixer. The impregnated material is dried and calcined in air, forming the catalyst, which comprises a metal exchanged/promoted molecular sieve having a zirconia containing layer. Calcination of the impregnated material can occur using various techniques known in the art, including tray calcination methods, calcination in a rotary kiln, or through use of a fluidized bed calciner. Flash drying and calcination in a single step (e.g., using a fluidized bed calciner) is preferred in certain embodiments as such methods provide short residence times and uniform drying/calcination on a particle level.

Without intending to be bound by theory, it is thought that upon drying and calcining, the metal from the metal salt enters the pores of the small-pore molecular sieve, migrates to the Brønsted Acid sites via concentration gradient effect with or without the presence of $H_2O$ vapor, then serving as a promoter metal, while the particles of zirconia (or other metal oxide) do not enter the pore structure of the molecular sieve. Instead, the zirconia forms an enrichment layer (zirconia containing layer) over the small-pore molecular sieve and/or between particles, bounding them together to form an agglomerate of zeolite particles which are promoted with a metal.

In one or more embodiments, at least one binder compound is added to the aqueous based washcoat preparation following addition and dispersion of the molecular sieve powder, of which the particles have been enriched with zirconia. The washcoat, including the binder, is then applied to a substrate, dried, and calcined to produce the final catalyst material. Such additional binder(s) can be selected from any binder known to those in the art. In one or more embodiments, the additional binder can be a titania, alumina, zirconia, or silica binder known to those in the art. For example, without limitation, the binder can be selected from titanium oxychloride ($TiOCl_2$), titanium oxysulfate ($TiOSO_4$), aluminum trihydrate ($Al(OH)_3$), boehmite (AlO(OH)), aluminum nitrate $Al(NO_3)_3$, $SiO_2$ sols (e.g. commercially available Nalco® 1034A), and zirconia compounds.

Method of Reducing $NO_x$ and Exhaust Gas Treatment System

In general, the molecular sieve material having a zirconia-containing layer that is described above can be used as a molecular sieve, adsorbent, catalyst, catalyst support, or binder thereof. In one or more embodiments, the material is used as a catalyst.

An additional aspect of the invention is directed to a method of catalyzing a chemical reaction wherein the catalyst of one or more embodiments may be employed to catalyze a chemical reaction wherein the catalyst is employed as catalytically active material.

Among others, said catalyst may be employed as catalyst for the selective reduction (SCR) of nitrogen oxides ($NO_x$); for the oxidation of $NH_3$, in particular for the oxidation of $NH_3$ slip in diesel systems.

One or more embodiments provide a method of selectively reducing nitrogen oxides ($NO_x$). In one or more embodiments, the method comprises contacting an exhaust gas stream containing $NO_x$ with the catalyst of one or more embodiments. In particular, the selective reduction of nitrogen oxides wherein the selective catalytic reduction catalyst comprises a washcoat including a small-pore molecular sieve having a pore structure and a maximum ring size of eight tetrahedral atoms and containing a promoter metal, and a zirconia (or other metal oxide) containing layer on the small-pore molecular sieve containing the promoter metal, of embodiments of the invention, is employed as catalytically active material in a reaction carried out in the presence of ammonia or urea.

While ammonia is the reducing agent of choice for stationary power plants, urea is the reducing agent of choice for mobile SCR systems. Typically, the SCR system is integrated in the exhaust gas treatment system of a vehicle and, also typically, contains the following main components: selective catalytic reduction catalyst comprising a washcoat including a small-pore molecular sieve having a pore structure and a maximum ring size of eight tetrahedral atoms and containing a promoter metal, and a zirconia (or other metal oxide) containing layer on the small-pore molecular sieve containing the promoter metal according to embodiments of the invention and an injector to inject a reductant such as ammonia or an ammonia precursor (e.g. urea) located upstream from the SCR catalytic article. In specific embodiments, the system can include a urea storage tank; a urea pump; a urea dosing system; a urea injector/nozzle; and a respective control unit.

In other embodiments, the SCR catalyst according to one or more embodiments is employed as an SCR catalyst in an exhaust gas treatment system for lean-burn gasoline direct injection (GDI) engines. In such cases, the SCR catalyst according to one or more embodiments serves as a passive ammonia-SCR catalyst and is able to store ammonia effectively at temperatures of 400° C. and above.

As used herein, the term "stream" broadly refers to any combination of flowing gas that may contain solid or liquid particulate matter. The term "gaseous stream" or "exhaust gas stream" means a stream of gaseous constituents, such as the exhaust of a lean burn engine (i.e., an engine that burns fuel in the presence of an excess of oxygen), which may contain entrained non-gaseous components such as liquid droplets, solid particulates, and the like. The exhaust gas stream of a lean burn engine typically further comprises combustion products, products of incomplete combustion, oxides of nitrogen, combustible and/or carbonaceous particulate matter (soot), and un-reacted oxygen and nitrogen.

The term nitrogen oxides, $NO_x$, as used in the context of embodiments of the invention designates the oxides of nitrogen, especially dinitrogen oxide ($N_2O$), nitrogen monoxide (NO), dinitrogen trioxide ($N_2O_3$), nitrogen dioxide ($NO_2$), dinitrogen tetroxide ($N_2O_4$), dinitrogen pentoxide ($N_2O_5$), nitrogen peroxide ($NO_3$).

A further aspect of the invention is directed to an exhaust gas treatment system. In one or more embodiments, the exhaust gas treatment system comprises an exhaust gas stream optionally containing a reductant like ammonia, urea, and/or hydrocarbon, and in specific embodiments, ammonia and/or urea, and a selective catalytic reduction catalyst comprising a washcoat including a small-pore molecular sieve having a pore structure and a maximum ring size of eight tetrahedral atoms and containing a promoter metal, and a zirconia (or other metal oxide) containing layer on the small-pore molecular sieve containing the promoter metal according to one or more embodiments. The catalyst is effective for destroying at least a portion of the ammonia in the exhaust gas stream.

In one or more embodiments, the catalyst can be disposed on a substrate, for example a soot filter. The soot filter, catalyzed or non-catalyzed, may be upstream or downstream of the catalyst. In one or more embodiments, the system can further comprise a diesel oxidation catalyst. In specific embodiments, the diesel oxidation catalyst is located upstream of the catalyst. In other specific embodiments, the diesel oxidation catalyst and the catalyzed soot filter are upstream from the catalyst.

In specific embodiments, the exhaust is conveyed from the engine to a position downstream in the exhaust system, and in more specific embodiments, containing $NO_x$, where a reductant, e.g. urea, is added and the exhaust stream with the added reductant is conveyed to the catalyst.

For example, a catalyzed soot filter, a diesel oxidation catalyst, and a reductant are described in WO 2008/106519, which is herein incorporated by reference. In specific embodiments, the soot filter comprises a wall-flow filter substrate, where the channels are alternately blocked, allowing a gaseous stream entering the channels from one direction (inlet direction), to flow through the channel walls and exit from the channels from the other direction (outlet direction).

An ammonia oxidation catalyst (AMOx) may be provided downstream of the catalyst of one or more embodiments to remove any slipped ammonia from the system. In specific embodiments, the AMOx catalyst may comprise a platinum group metal such as platinum, palladium, rhodium, or combinations thereof.

Such AMOx catalysts are useful in exhaust gas treatment systems including an SCR catalyst. As discussed in commonly assigned U.S. Pat. No. 5,516,497, the entire content of which is incorporated herein by reference, a gaseous stream containing oxygen, nitrogen oxides, and ammonia can be sequentially passed through first and second catalysts, the first catalyst favoring reduction of nitrogen oxides and the second catalyst favoring the oxidation or other decomposition of excess ammonia. As described in U.S. Pat. No. 5,516,497, the first catalysts can be a SCR catalyst comprising a zeolite and the second catalyst can be an AMOx catalyst comprising a zeolite.

AMOx and/or SCR catalyst composition(s) can be coated on the flow through or wall-flow filter. If a wall flow substrate is utilized, the resulting system will be able to remove particulate matter along with gaseous pollutants. The wall-flow filter substrate can be made from materials commonly known in the art, such as cordierite, aluminum titanate or silicon carbide. It will be understood that the loading of the catalytic composition on a wall flow substrate will depend on substrate properties such as porosity and wall thickness, and typically will be lower than loading on a flow through substrate.

One exemplary emissions treatment system is illustrated in FIG. 16, which depicts a schematic representation of an emission treatment system 32. As shown, an exhaust gas stream containing gaseous pollutants and particulate matter is conveyed via exhaust pipe 36 from an engine 34 (e.g., a diesel engine, lean GDI engine, or other lean burn engine) to a diesel oxidation catalyst (DOC) 38 to a catalyzed soot filter (CSF) to a selective reductive catalyst (SRC), which is coated with the washcoat composition of the present invention. In the DOC 38, unburned gaseous and non-volatile hydrocarbons (i.e., the SOF) and carbon monoxide are largely combusted to form carbon dioxide and water. In addition, a proportion of the NO of the NO component may be oxidized to $NO_2$ in the DOC.

The exhaust stream is next conveyed via exhaust pipe 40 to a catalyzed soot filter (CSF) 42, which traps particulate matter present within the exhaust gas stream. The CSF 42 is optionally catalyzed for passive or active soot regeneration. The CSF 42 can optionally include a SRC composition of the invention for the conversion of $NO_x$ present in the exhaust gas.

After removal of particulate matter, via CSF 42, the exhaust gas stream is conveyed via exhaust pipe 44 to a downstream selective catalytic reduction component 46 of the invention for the further treatment and/or conversion of $NO_x$. The exhaust gas passes through the SCR component 46 at a flow rate which allows sufficient time for the catalyst composition to reduce the level of $NO_x$ in the exhaust gas at a given temperature. The SCR component 46 may optionally be included in the emission treatment system when CSF 42 already includes an SCR catalyst composition. An injector 50 for introducing a nitrogenous reducing agent into the exhaust stream is located upstream of the SRC 46. The introduced nitrogenous reducing agent into the gas exhaust stream promotes the reduction of the $NO_x$ to $N_2$ and water as the gas is exposed to the catalyst composition. If the CSF 42 also contains an SCR catalyst, the injector 50 can be moved to a position upstream of the CSF.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXAMPLES

Example 1—10% $ZrO_2$ as Zirconyl Acetate Added to Slurry

Cu exchanged CHA (3.25 wt. % CuO, SAR 28) was dispersed in water, recycled through an in-line homogenizer @ 50 Hz to break large agglomerates to D90<14 µm. Zirconyl acetate binder was then added to achieve total binder loading of 10 wt. % calcined washcoat basis. Final pH of the resulting slurry was about 4.0. The mixture was then coated onto a cordierite substrate, dried, and calcined to 450° C. to form the active catalytic coating. Drying was accomplished using a forced fan heated oven to facilitate flow through the part. Because the zirconyl acetate was highly soluble, it moved through the washcoat during drying and formed an enrichment layer on the surface of the CHA. Final washcoat composition was 2.9% CuO, 87.1% CHA and 10% $ZrO_2$ upon coating, drying and calcination.

Referring to FIG. 1, SCR conversion was relatively unchanged on the low temperature end, 200-300° C., and slightly higher as the high temperature end for the 10% $ZrO_2$ version (relative to the same washcoat prepared with only 5% $ZrO_2$).

Zirconyl acetate solution also contained excess acetic acid for stability purposes (acetic acid/$ZrO_2$ mole ratio ~1.6), so more CuO became soluble and migrated to the surface, explaining the selectivity change that was observed between 450-600° C. where performance of 10% $ZrO_2$ dropped, as free CuO (ex-exchange site) is known to oxidize $NH_3$ to actually form more $NO_x$ vs. reducing what is already there.

As shown in FIG. 1, the enrichment of $ZrO_2$ on the washcoat surface is responsible for reduced $N_2O$ make at all temperatures (200-600° C.). This experiment illustrates a correlation between zirconium oxide concentration in the washcoat and $N_2O$ make, with higher zirconium oxide amounts leading to reduced $N_2O$ make.

Example 2—5% Zirconyl Acetate Plus Higher Slurry Conductivity

To explore impact of higher soluble Zr, one slurry batch was produced in the same manner as Example 1 but with only 5 wt. % $ZrO_2$ added as zirconyl acetate. After the addition of zirconyl acetate, the slurry was split into two samples, designated as Sample 1 and Sample 2. Sample 1 was not modified further, and, thus, had the same composition as one of the compositions of Example 1.

To Sample 2 was added 0.1% ammonium nitrate ($NH_4NO_3$) to increase conductivity (as measured using a Cole Parmer Item# EW-19601-04). Conductivity increased from 870 µS/cm to 2200 µS/cm with final pH of both slurries being 4.4 (see Table 1).

TABLE 1

Solubility of Cu and Zr in aqueous liquid phase of the washcoat slurry post centrifugation

| Sample | Solids | pH | Conductivity (µS/cm) | Element | % Soluble |
|---|---|---|---|---|---|
| Sample 1 Low conductivity, low Zr solubility | 34.50 | 4.4 | 870 | Cu Zr | 4.04 12.71 |
| Sample 2 High conductivity, high Zr solubility | 37.00 | 4.4 | 2200 | Cu Zr | 10.60 27.24 |

Using same method as Example 1, the mixture was then coated onto a cordierite substrate, dried, and calcined to 450° C. to form the active catalytic coating. Drying was accomplished using a forced fan heated oven to facilitate flow through the part. Table 1 shows that the Zr solubility of Sample 2 was 2× higher than that of Sample 1. Solubility was measured by taking a sample of slurry, adding it to a centrifuge tube and subjecting it to 7800 rpm for 2 hours using a Thermo Electron Corporation IEC CL40R centrifuge. The resulting clear water white to blue colored supernatant (depending on how much $Cu^{2+}$ was soluble) was analyzed using inductively coupled plasma (ICP) to determine parts per million concentrations in the liquid phase, the % soluble fraction of a given element in the liquid phase was calculated based on the slurry solid content and elemental composition of the washcoat. Table 1 and Table 2 (see Example 3) demonstrate that the solubility of the Zr needs to be greater than 15% in the slurry phase to as high as 100% soluble in order to facilitate migration of the soluble species (i.e., zirconium compound) to the surface of the washcoat during drying.

Figure 2:
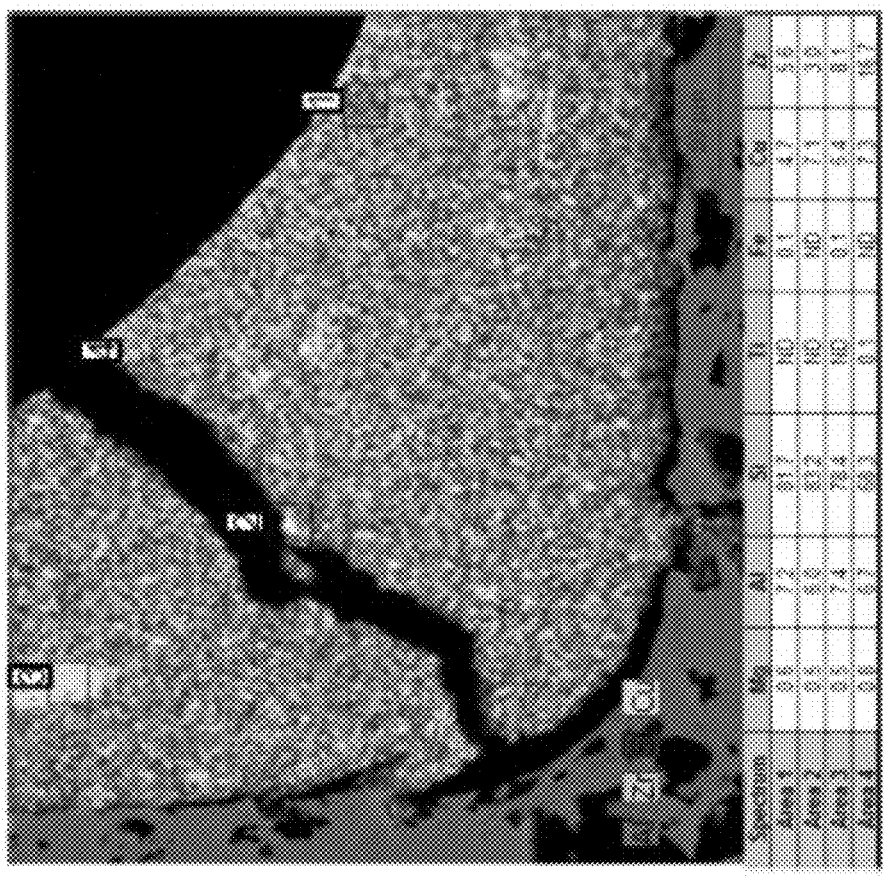
FIG. 2 is a SEM image of a catalyst material according to the Examples.
Figure 3:
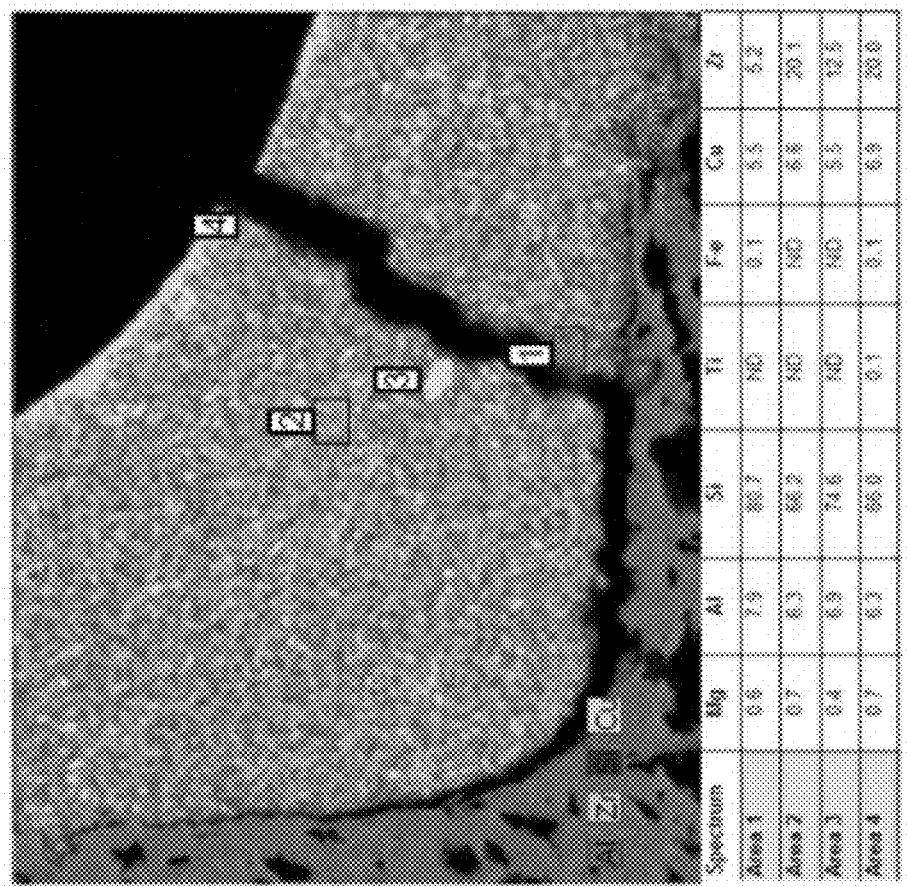
FIG. 3 is a SEM image of a catalyst material according to the Examples.

FIGS. 2 and 3 are scanning electron microscope (SEM) images of Sample 1 and Sample 2, respectively, focused on the portion of the washcoat layer in a corner of a coated substrate cell. FIG. 2 (Sample 1) and FIG. 3 (Sample 2) EDS tabular results both show higher Zr and Cu element concentration on the surface. FIG. 3, however, shows a visible enrichment band containing higher Cu and Zr, which is tied directly to the amounts of each element that are soluble in the aqueous slurry phase, as demonstrated in Table 1.

Figure 4:
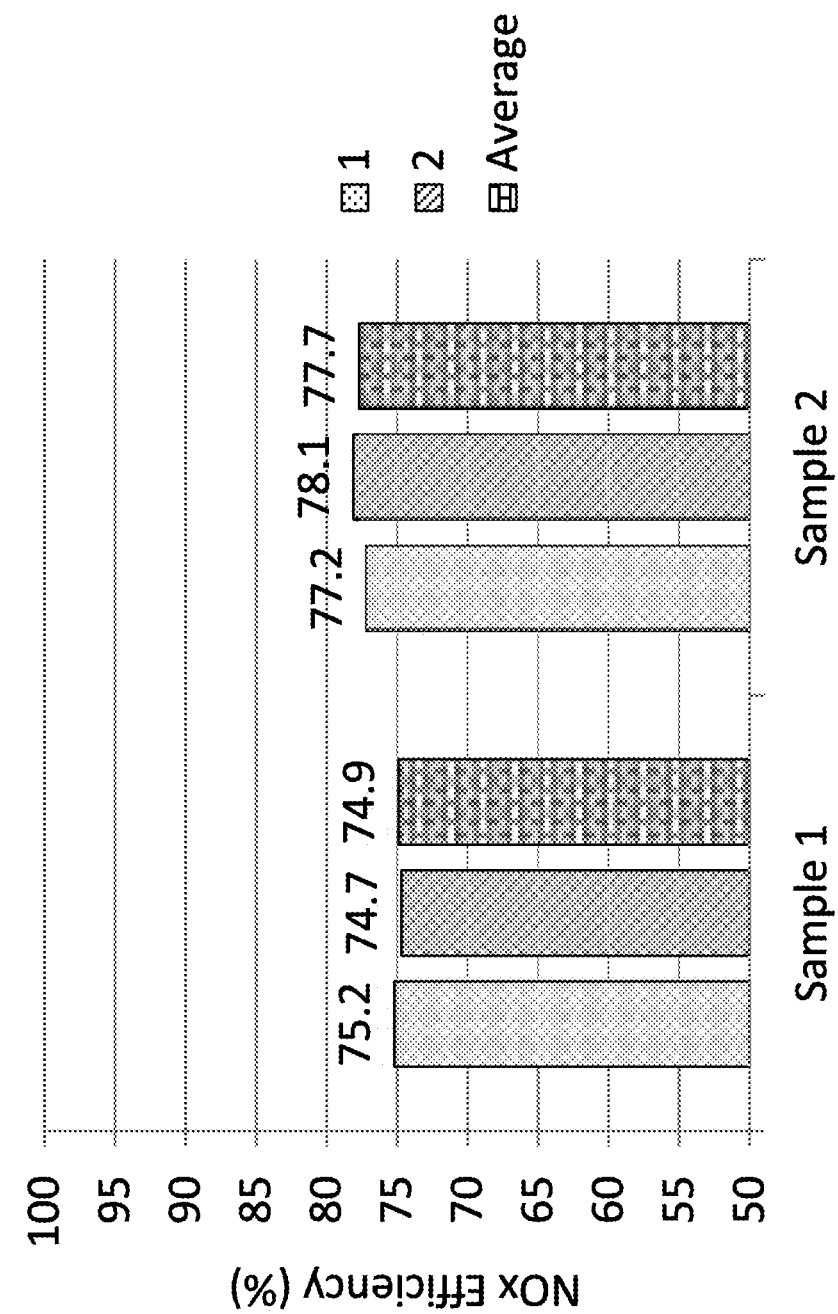
FIG. 4 is a bar chart of the $NO_x$ efficiency for catalyst materials according to the Examples.

FIG. 4 is a bar chart comparing Sample 2 and Sample 1 in terms of $NO_x$ efficiency when each sample was used in a specific emission treatment system (with results reported as two measurements per sample and the average thereof). FIG. 4 shows that Sample 2 (higher Zr and Cu on the surface, FIG. 3) has improved performance when compared to Sample 1 (FIG. 2). The system results include use of same/standardized (a constant) DOC as first catalyst in the system (6.5" φ×8" L with PGM at 70 g/ft$^3$), the second and third catalysts in the system were 8" φ×6" L 400/4.5 coated with Cu/CHA (SCR) slurry, and the fourth catalyst in the system was the same/standardized (a constant) Catalyzed Soot Filter (CSF) measuring 8" φ×10" L. The complete system is for medium duty application where low temperature performance is important. Prior to testing, the system was aged using a 6.7 L engine at 750° C. as measured at the Diesel Oxidation Catalyst (DOC) outlet. Efficiencies were measured using EPA75 test cycle and reported as weighted modal data DOC to SCR outlet without any regeneration step. Temperature at which data is generated was between 180 and 220° C. with average ca. 200° C. where data is recorded.

This example confirms that the presence of soluble zirconium species in the washcoat leads to increased migration of zirconium to the surface of the washcoat, which can improve low temperature $NO_x$ reduction. However, as noted above, the increase in soluble zirconium species in the outer portion of the washcoat is also accompanied by increased copper concentration in the same region, which is attributable to increased copper migration during the washcoating process. Copper migration in this manner can be detrimental to high temperature $NO_x$ conversion.

Example 3—8% $ZrO_2$/3.25% CuO/CHA

Step 1: 1.7 Kg Cu (II) nitrate crystal was dissolved in 3.6 kg commercially available nitric acid based zirconia sol with $ZrO_2$ content of 15% by weight by mixing at room temperature.

Figure 5:
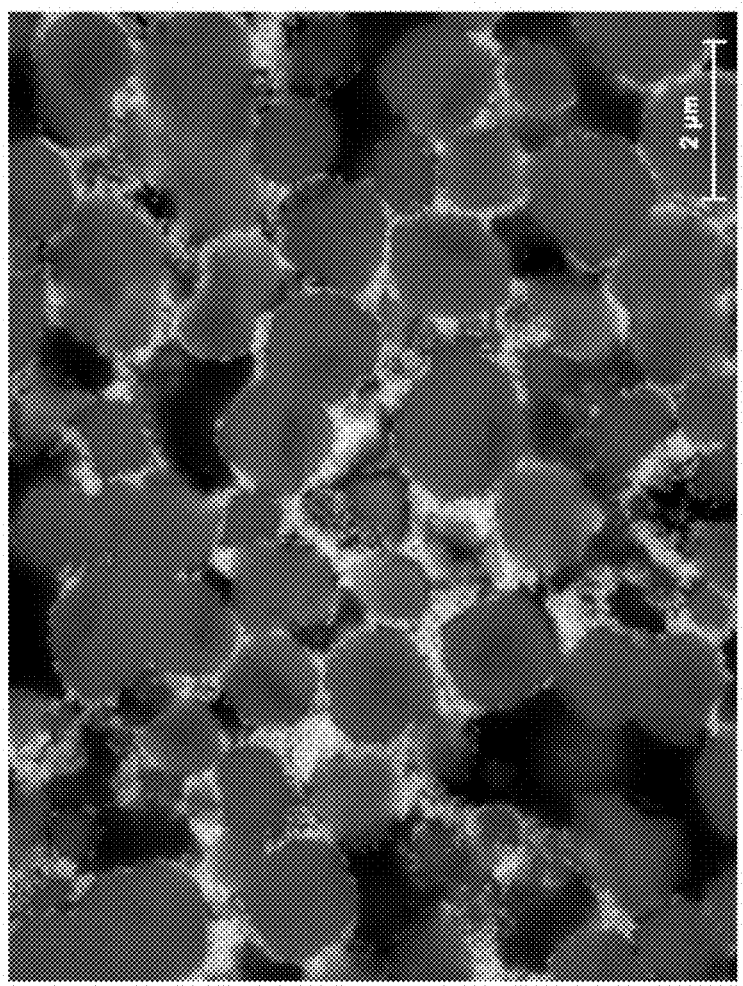
FIG. 5 is an SEM image of a catalyst material according to the Examples.

Step 2: The solution from step 1 was impregnated onto 18.8 kg spray dried $NH_4$/CHA powder then simultaneously dried/calcined. The product of this step, a 3% $ZrO_2$/3.25% CuO/CHA powder, is shown in FIG. 5 as a scanning electron microscope (SEM) image with magnification at 10000×. The SEM image shows the presence of the zirconium particles (lighter colored material) surrounding, and dispersed among, the zeolite particles (darker, larger particles).

Step 3: Calcined powder from step 2 was then dispersed in water, recycled through an in-line homogenizer @ 50 Hz to break large agglomerates to D90<14 μm. An additional 5% by wt. zirconyl acetate as binder was added to achieve total $ZrO_2$ loading of about 8% wt. % calcined, on a washcoat basis. The final pH of the resulting slurry was 3.8.

The mixture was then coated onto a cordierite substrate, dried, and calcined to 450° C. to form the active catalytic coating. Drying was accomplished using a forced fan heated oven to facilitate flow through the part. The final washcoat composition was 3.1% CuO, 89.1% CHA, and 7.8% $ZrO_2$ upon coating, drying, and calcination, and is designated as Sample 3 in Table 2. Table 2 shows that Sample 3 contained low Cu and Zr solubility due to a pre-preparation step which included fast drying/calcination of the 3% $ZrO_2$/3.25% CuO/CHA powder preparation step. This fast drying and calcination in air created a rapid concentration gradient in <1.5 seconds, which created a driving force to move the $Cu^{2+}$ to the Brønsted acid sites.

Sample 4 was prepared by dispersing Cu exchanged CHA (3.25 wt. % CuO, SAR 28) in water, recycled through an in-line homogenizer @ 50 Hz to break large agglomerates to $D_{90}$<14 μm. Zirconyl acetate binder was then added to achieve total binder loading of 5 wt. % on a calcined washcoat basis. Final pH of the resulting slurry was about 4.3. The mixture was then coated onto a cordierite substrate, dried, and calcined to 450° C. to form the active catalytic coating. Final composition of Sample 4 was 3.1% CuO/5.0% $ZrO_2$/91.9% CHA. Sample 4 contained higher soluble Cu and Zr in the slurry phase when compared to Sample 3.

TABLE 2

Solubility of Cu and Zr in aqueous liquid phase of the washcoat slurry post centrifugation

| Sample | Solids | pH | Element | % Soluble |
|---|---|---|---|---|
| Sample 3 | 43.00 | 3.8 | Cu | 1.40 |
| | | | Zr | 5.62 |
| Sample 4 | 48.00 | 4.3 | Cu | 3.57 |
| | | | Zr | 26.72 |

Figure 6:
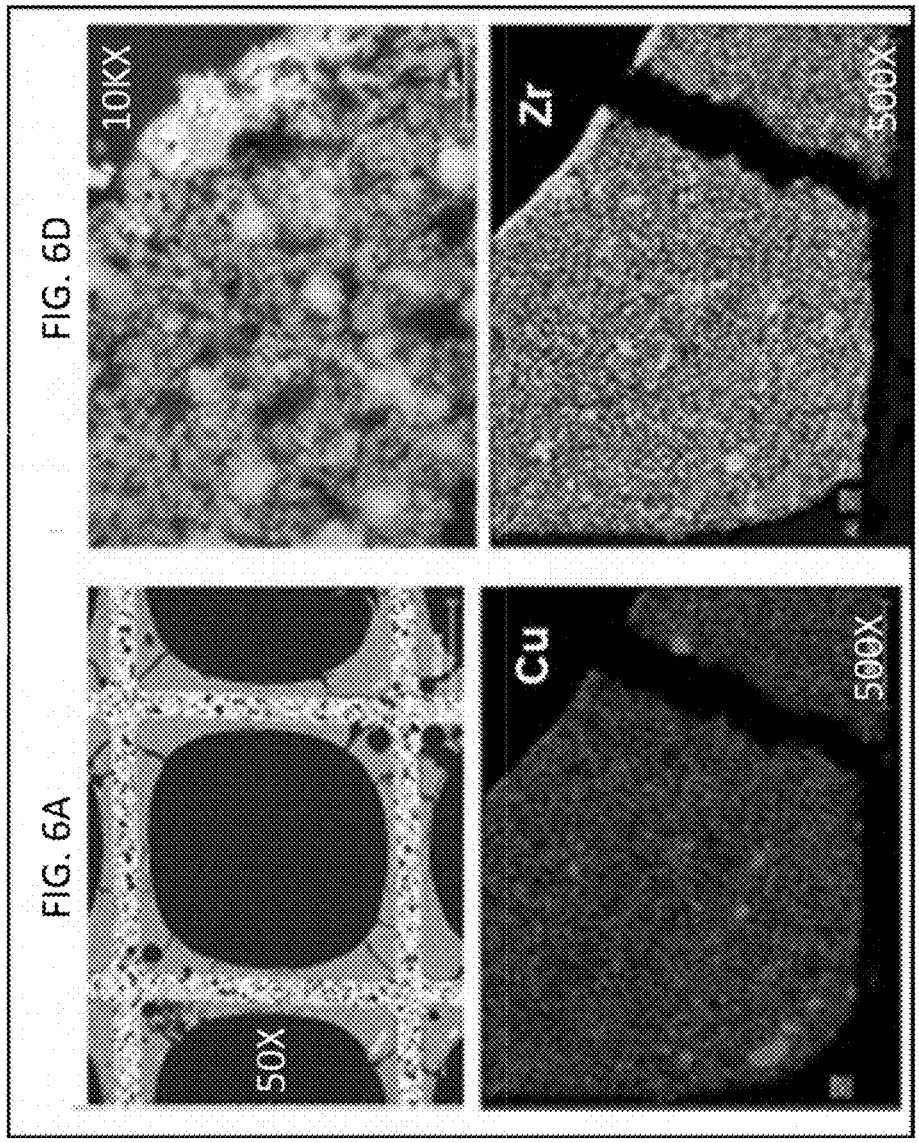
FIGS. 6A-6D are a collection of SEM images of a catalyst material according to the Examples.
Figure 7:
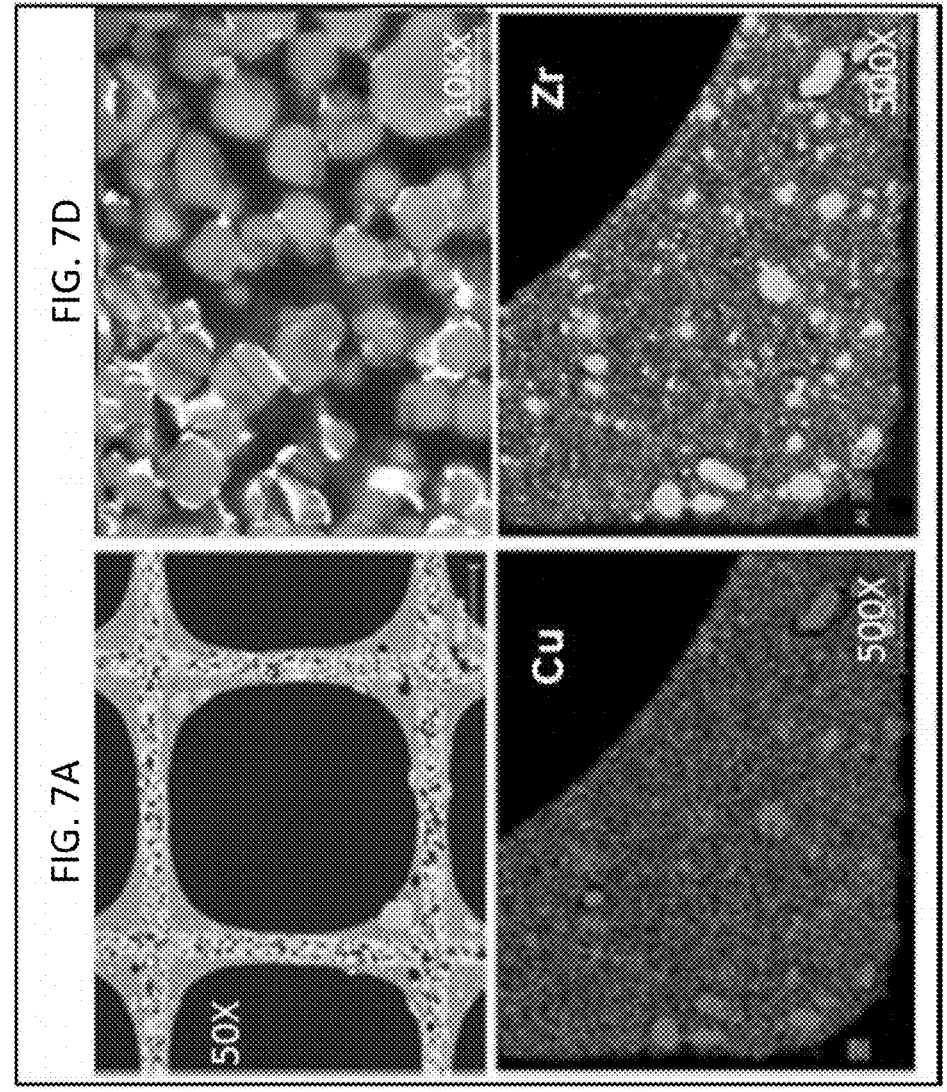
FIGS. 7A-7D are a collection of SEM images of a catalyst material according to the Examples.

FIGS. 6A-6D are a collection of scanning electron microscope (SEM) images of the material of Sample 4. The top left box (6A) is an SEM photomicrograph showing washcoat distribution within the unit substrate cell with magnification 50×. Going counterclockwise, the bottom left box (6B) shows distribution of Cu in the washcoat using Electron Dispersive Spectroscopy (EDS) mapping, and illustrates that Cu is distributed evenly through the washcoat layer with slight enrichment at the surface of the coating. Continuing counterclockwise, the bottom right corner photomicrograph (6C) shows Zr distribution via EDS. There is a distinctive enrichment band of Zr at the surface of the washcoat, which correlates with Zr solubility in Table 2. At the top right corner is another SEM photomicrograph (6D) at 10,000×, focusing in on the Zr enrichment layer on the surface which is about 1-3 μm thick. FIGS. 6A-5D demonstrate enrichment of $ZrO_2$ on the surface of the washcoat as also observed for Examples 1 and 2.

FIGS. 7A-7D are a collection of scanning electron microscope (SEM) images of the material of Sample 3. These figures demonstrate that the sample with reduced amounts of soluble Cu and Zr did not form any enrichment layer;

however, some layering and particle to particle bonding with nano-$ZrO_2$ is noted, and the washcoat also appears to be more porous. The top left corner (7A) shows washcoat distribution within the unit substrate cell with magnification 50×. Continuing counterclockwise, the bottom left corner (7B) demonstrates that Cu is uniformly dispersed throughout the washcoat. The bottom right corner (7C) shows that Zr is dispersed throughout the washcoat with areas of higher concentration (brighter areas), such areas are also present in other samples but they are more prevalent as Zr concentration increases. No enrichment of Zr is noted on the surface of the washcoat layer. Ending with the upper right corner (7D), Zr is clearly evident on the surface of some particles and forming bridges between particles. The coating also appears to be more porous. It is thought that fine particles of CHA are bound together with larger ones during the flash dried/calcined step during preparation of the $ZrO_2$/Cu/CHA composite powder step. Zirconyl acetate then added during the slurry prep/washcoat fabrication step further binds particles together during the coated substrate drying and calcination steps to form the final 7.8% $ZrO_2$/3.1% CuO, 89.1% CHA washcoat layer.

Table 3 outlines the reactor gas composition and test protocol.

TABLE 3

SCR CAEF

| | | |
|---|---|---|
| # of Reactor Passes | 1 | |
| Core Width (mm) | 24.9 | |
| Core Length (mm) | 76.2 | |
| Test Temperatures (° C.) | | |
| Temp. 1 | 250 | |
| Temp. 2 | 525 | |
| Run Gases Concentration/Flow | Concentration | Flow |
| $N_2$ %/(l/min) | $N_2$ | 9.32 |
| $O_2$ %/(l/min) | 10.00 | 9.37 |
| Ammonia ppm/(l/min) | 500 | 0.52 |
| $NO_x$ ppm/(l/min) | 500 | 0.52 |
| Water %/(l/min) | 5% | 1.0 |
| Total gas flow (l/min) | | 20.76 |
| Space Velocity (hrs$^{-1}$) | 50006 | |

Figure 8:
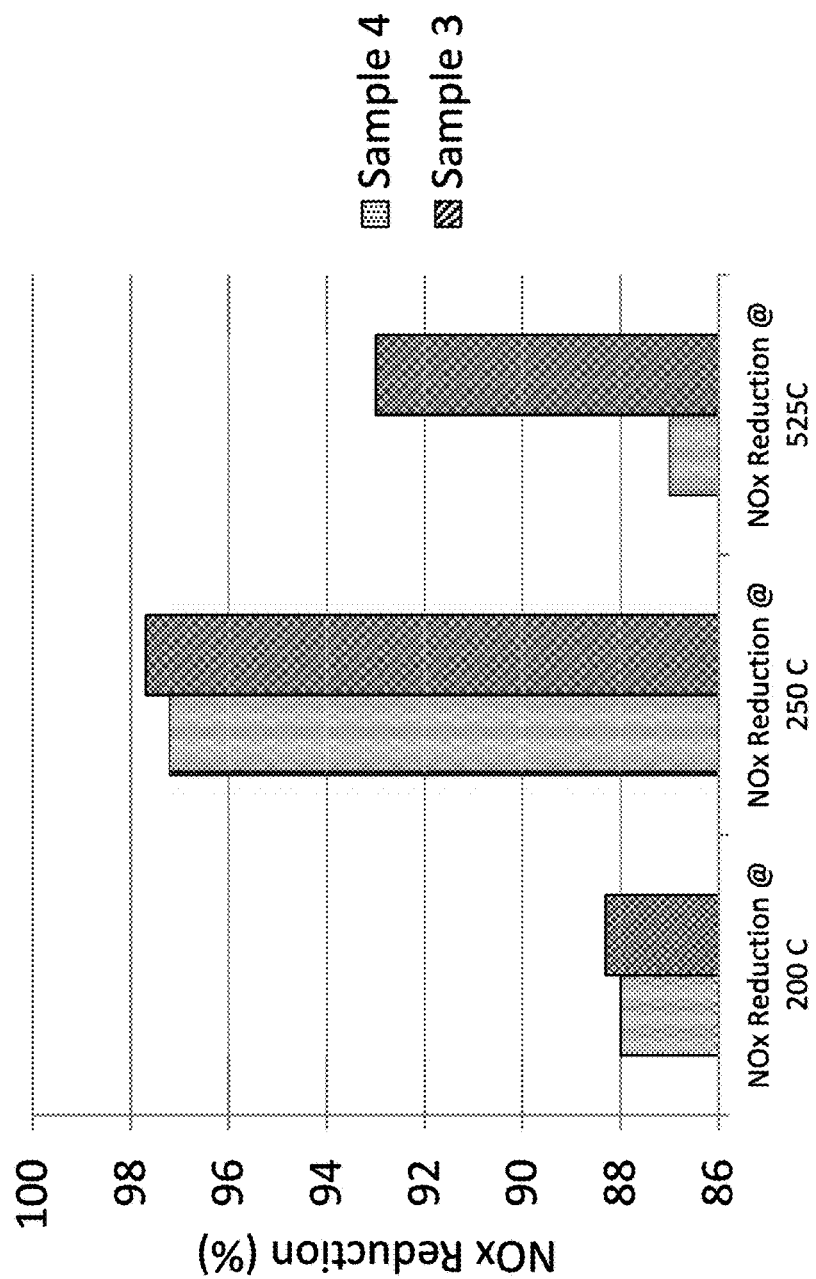
FIG. 8 is a bar chart of the $NO_x$ reduction for catalyst materials according to the Examples.

FIG. 8 is a bar chart showing the $NO_x$ reduction at 200, 250, and 525° C. for the material of Sample 3 compared to Sample 4, which contains Zr enrichment on the surface of the washcoat. The samples were first aged at 700° C. in 10% steam and air for 4 hours. They were then tested in a reactor, per Table 3. FIG. 8 demonstrates that reduction of $NO_x$ at 200° C. and 250° C. were marginally improved, with $NO_x$ conversion significantly higher at 525° C. The broader performance window exhibited by Sample 3 (higher zirconium loading with less soluble zirconium species) is indicative of an improved exchange of $Cu^{2+}$ to the Brønsted acid sites and the benefit of the thermal fixation step prior to incorporating the 3% $ZrO_2$/3.25% CuO/CHA powder to produce the final washcoat with composition 7.8% $ZrO_2$/3.1% CuO/89.1% CHA on N400/4 substrate.

Figure 9:
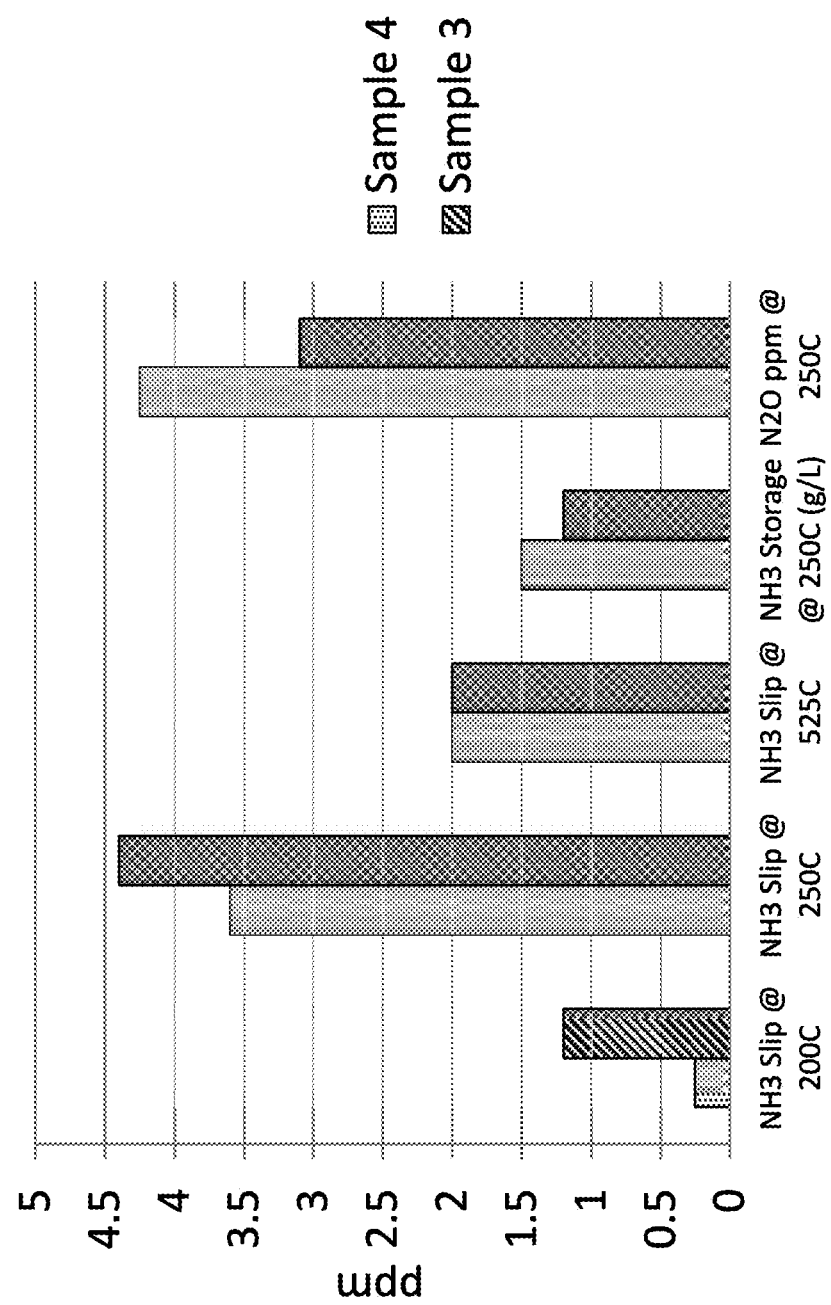
FIG. 9 is a bar chart of the $NH_3$ slip, $NH_3$ storage, and $N_2O$ make for catalyst materials according to the Examples.

FIG. 9 is a bar chart showing the $NH_3$ Slip, $NH_3$ Storage, and $N_2O$ make at varying temperatures for the materials of Example 3. FIG. 9 demonstrates that $N_2O$ has been further reduced for the material of Sample 3 when compared to the material of Sample 4. This can be explained as Sample 3 contains a higher $ZrO_2$ concentration (8% versus 5% for Sample 4) with enrichment on the particle level, reduced soluble Cu and Zr in the slurry phase coupled with more effective exchange of $Cu^{2+}$ to the Brønsted acid sites. This example shows that the benefits of increasing zirconium oxide concentration in the washcoat (such as reduced $N_2O$ make and improved $NO_x$ reduction at low temperature) can be achieved without causing undesirable copper migration by reducing reliance on soluble zirconium species to obtain the increased zirconium oxide concentration.

Example 4: 5% Nano-Ceria/Zirconia on 3.25% CuO/CHA 3.8 Kg of 3.25% CuO/CHA is first dispersed in 6.2 Kg of water then recycled through an in-line homogenizer @ 50 Hz to break large agglomerates to a achieve a particle size distribution with $D_{90}$<20 μm. To this mixture 794 grams of an aqueous dispersion of $(Ce_{45}Nd_5Zr_{50})O_2$ as defined in Table 4 is added to the mixture and recirculation through the homogenizer is continued until the particle size distribution has D90<14 μm. The pH of the final slurry was 4.6.

The mixture was then coated onto a cordierite substrate, dried, and calcined to 450° C. to form the active catalytic coating. Drying was accomplished using a forced fan heated oven to facilitate flow through the part. The final washcoat composition was 2.25% CeO2, 0.25% Nd2O3, 2.51% ZrO2, 3.09% CuO and 91.91% CHA upon coating, drying, and calcination, and is designated as Sample 5 in Table 5.

Sample 6 was prepared by dispersing Cu exchanged CHA (3.25 wt. % CuO, SAR 28) in water, recycled through an in-line homogenizer @ 50 Hz to break large agglomerates to $D_{90}$<14 μm. Zirconyl acetate binder was then added to achieve total binder loading of 5 wt. % on a calcined washcoat basis. Final pH of the resulting slurry was about 4.3. The mixture was then coated onto a cordierite substrate, dried, and calcined to 450° C. to form the active catalytic coating. Final composition of Sample 6 was 3.1% CuO/5.0% $ZrO_2$/91.9% CHA.

TABLE 4

Aqueous dispersion of <1 μm particles of $ZrO_2$ doped with $CeO_2$ and $Nd_2O_3$

| Test | Nano-$CeO_2$/$Nd_2O_3$/$ZrO_2$ | Units |
|---|---|---|
| $ZrO_2$ + $HfO_2$ (bal.) | 50.1 | %, oxide basis |
| $CeO_2$ | 44.9 | %, oxide basis |
| $Nd_2O_3$ | 5.0 | %, oxide basis |
| Solids Content | 25.2 | % of dispersion |
| pH | 4.96 | |

TABLE 5

Solubility of Cu and Zr in the aqueous liquid phase of the washcoat slurry post centrifugation

| Sample | Solids | pH | Element | % Soluble |
|---|---|---|---|---|
| Sample 5 | 34.0 | 4.6 | Cu | not detected |
| | | | Zr | not detected |
| Sample 6 | 33.0 | 4.3 | Cu | 3.37 |
| | | | Zr | 14.77 |

FIGS. 10A-10D are a collection of scanning electron microscope (SEM) images of the material of Sample 5. The top left box (10A) is an SEM photomicrograph showing washcoat distribution within multiple unit substrate cells with magnification 25×. Going counterclockwise, the bottom left box (10B) shows that distribution of Ce in the washcoat using Electron Dispersive Spectroscopy (EDS) mapping, and it shows Ce distributed evenly through the washcoat. It is inferred that both Zr and Nd are also well dispersed based on the composition of the sol as defined in Table 4. Continuing counterclockwise, the photomicrograph on the bottom right (10C) shows Cu is uniformly dispersed through the washcoat and finally the top right photomicrograph (10D) shows porosity is evident in the coating once magnified to 500×.

Figure 11:
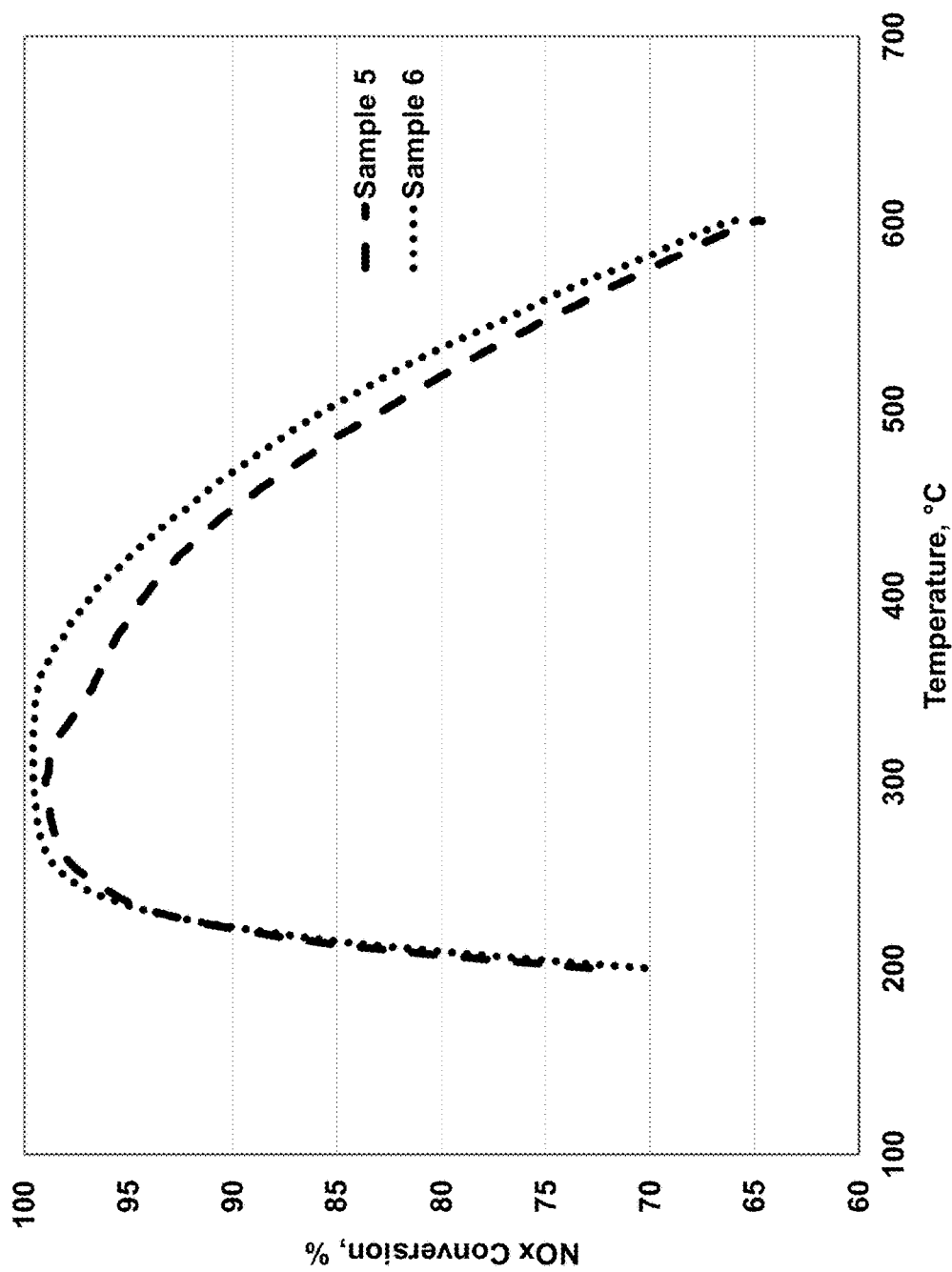
FIG. 11 is a graph of the $NO_x$ conversion versus temperature of catalyst materials according to the Examples.
Figure 12:
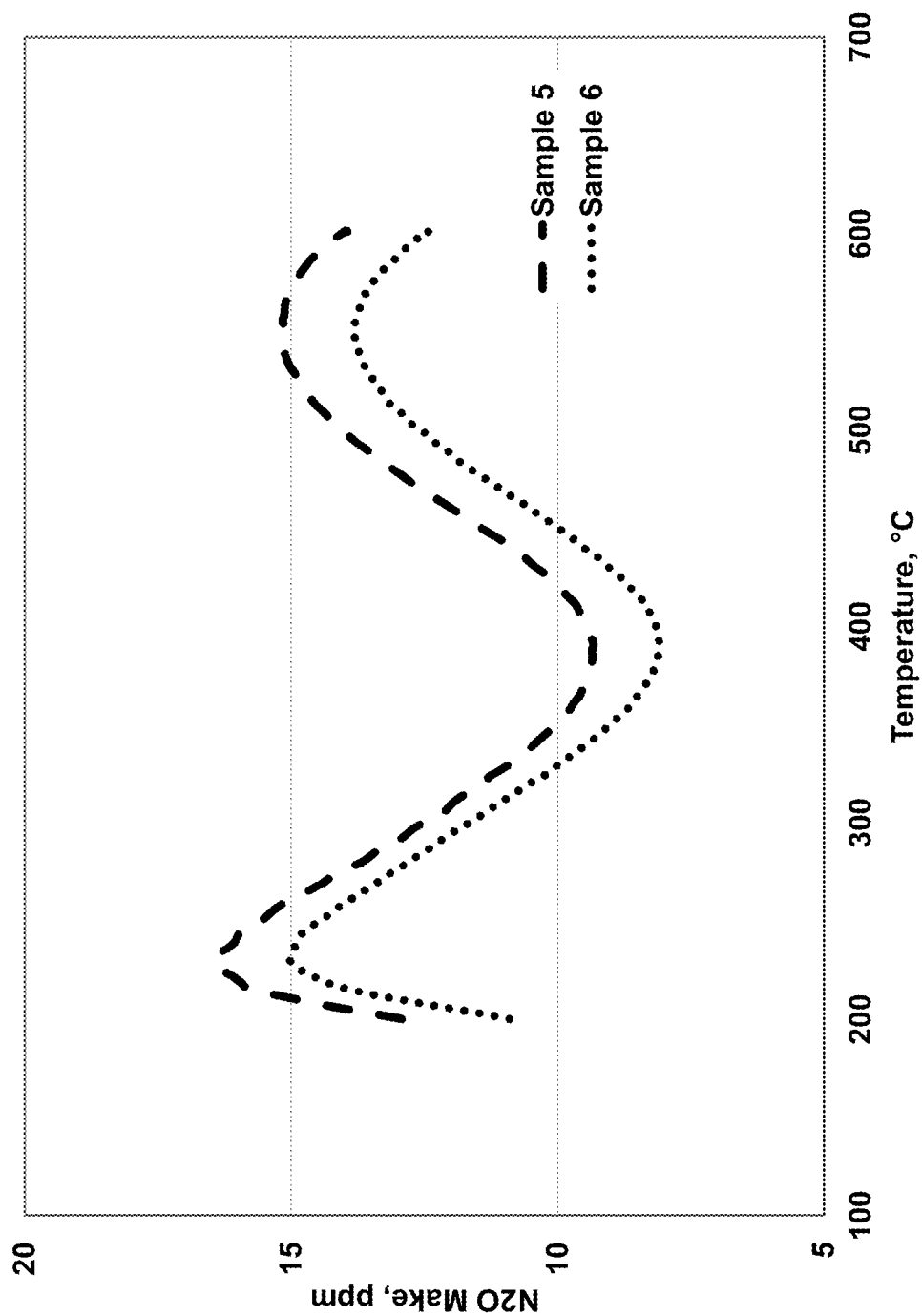
FIG. 12 is a graph of the $N_2O$ make versus temperature of catalyst materials according to the Examples.

Referring to FIG. 11, SCR conversion was marginally improved at 200-250° C. with Sample 5 but was marginally inferior to Sample 6 at temperatures of between 250-600° C. FIG. 12 shows that Sample 5 is slightly inferior to Sample 6 in terms of $N_2O$ make. Although not bound by a theory of operation, it is suspected that the oxidative properties of $CeO_2$ are at least partially responsible for this result. However, it is thought that the use of a ceria-zirconia composite material will have improved qualities in terms of oxidizing soot during regenerations, thereby minimizing fouling of the zeolite. Additionally, metal oxide composites combining greater amounts of zirconia as compared to ceria could achieve the desired reduction in $N_2O$ make.

Example 5: 6% $ZrO_2$ on 3.25% CuO/CHA 1.7 Kg Cu (II) nitrate crystal was dissolved in 7.2 kg commercially available nitric acid based zirconia sol with $ZrO_2$ content of 15% by weight (ZSL-15N available from Daiichi Kigenso Kagaku Kogyo Co., Ltd) by mixing at room temperature. The resulting solution was impregnated onto 18.2 kg spray dried $NH_4$/CHA powder in a mixer, then simultaneously dried/calcined. The product of this step is a 6% $ZrO_2$/3.25% CuO/CHA powder. The calcined powder was then dispersed in water, recycled through an in-line homogenizer @ 50 Hz to break large agglomerates to D90<14 µm. This fast drying and calcination in air created a rapid concentration gradient in <1.5 seconds, which, without being bound by theory, is believed to create a driving force to move the $Cu^{2+}$ to the Brønsted acid sites.

Figure 13:
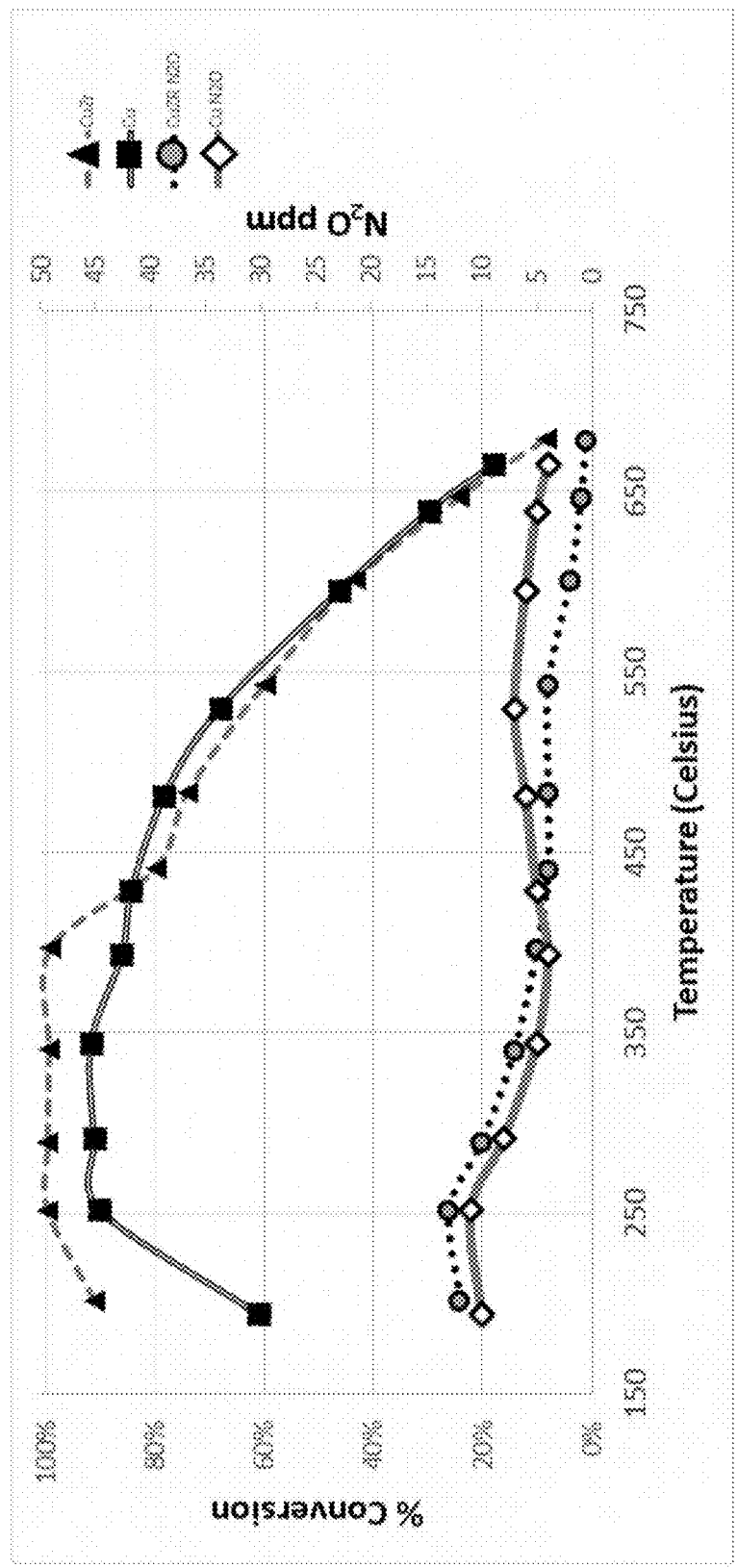
FIG. 13 is a graph of $NO_x$ conversion and $N_2O$ make versus temperature of a catalyst material according to the Examples in comparison to a prior art material.

FIG. 13 shows powder reactor temperature sweep comparing standard 3.25% ion exchanged Cu/CHA material to 6% $ZrO_2$/3.25% CuO/CHA prepared in this Example, with the lefthand y-axis providing % conversion of $NO_x$ and the righthand y-axis providing $N_2O$ make in ppm. In the graph, the triangles denote the $NO_x$ conversion of the zirconia-modified material, the square denotes the $NO_x$ conversion of the comparative Cu/CHA material, the circle denotes the $N_2O$ make for the zirconia-modified material, and the diamond denotes the $N_2O$ make for the comparative CuCHA material. As shown, the modification of the CHA material with zirconia provides improved $NO_x$ conversion at low temperature and slightly elevated $N_2O$ make at low temperature. High temperature $NO_x$ performance is roughly the same for both materials, with the zirconia-modified material providing improved $N_2O$ make at higher temperature.

Example 6: 6% $Al_2O_3$ on 3.25% CuO/CHA 1.7 Kg Cu (II) nitrate crystal was dissolved in 5.4 kg commercially available nitric acid based alumina sol with $Al_2O_3$ content of 20% by weight (Dispal 23N4-20 available from Sasol), a large crystal boehmite material, by mixing at room temperature. The resulting solution was impregnated onto 18.2 kg spray dried $NH_4$/CHA powder by spraying the solution onto the CHA powder in a mixer, then simultaneously dried/calcined. The product of this step is a 6% $Al_2O_3$/3.25% CuO/CHA powder. The calcined powder was then dispersed in water, recycled through an in-line homogenizer @ 50 Hz to break large agglomerates to D90<14 µm. This fast drying and calcination in air created a rapid concentration gradient in <1.5 seconds, which, without being bound by theory, is believed to create a driving force to move the $Cu^{2+}$ to the Brønsted acid sites.

Figure 14:
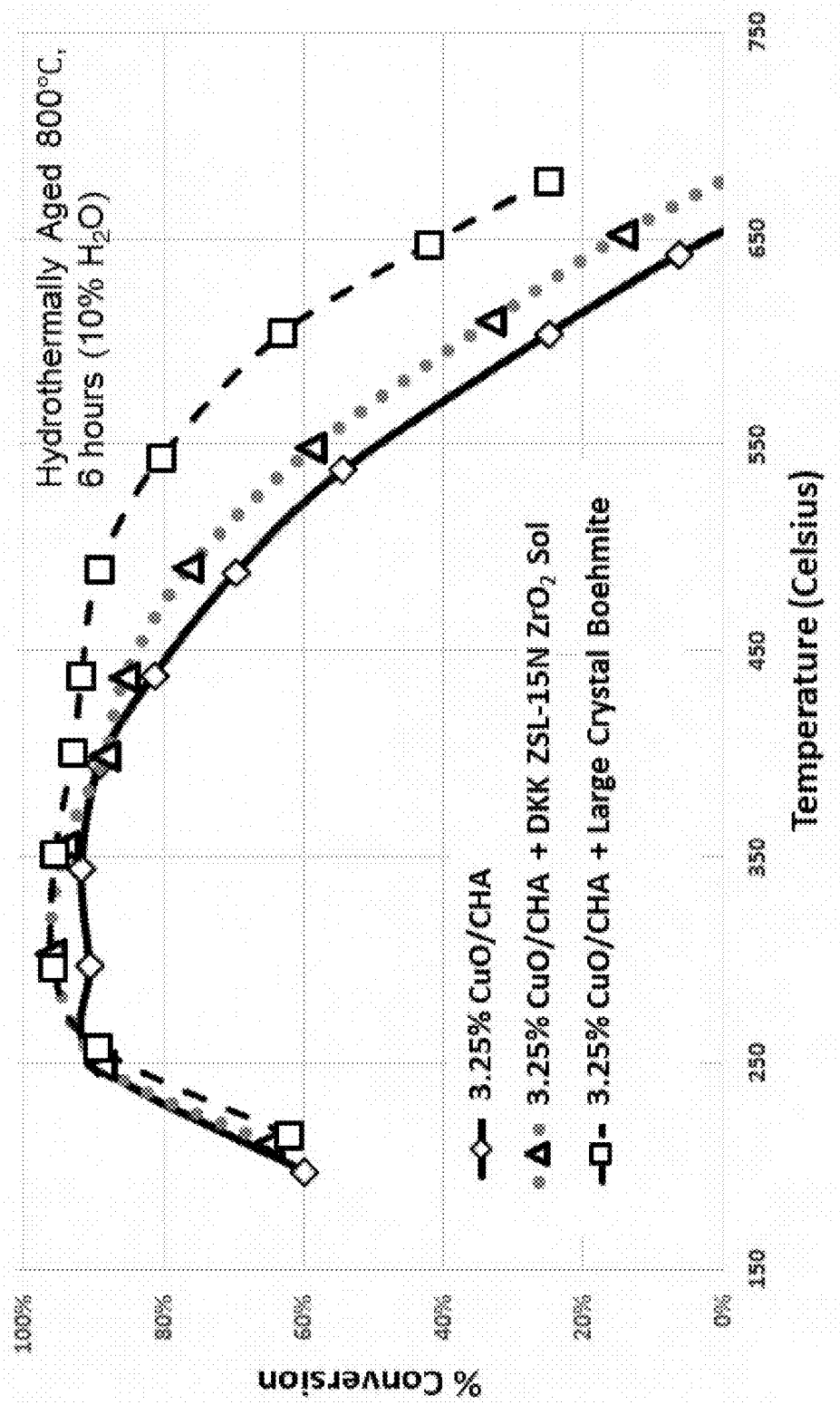
FIG. 14 is a graph of $NO_x$ conversion versus temperature of catalyst materials according to the Examples in comparison to a prior art material.

The catalyst materials of Example 5 and Example 6 were hydrothermally aged at 800° C. for 6 hours in the presence of 10% $H_2O$ and tested for $NO_x$ conversion performance in comparison to an unmodified CuO/CHA material aged under the same conditions. The results are set forth in FIG. 14, with the CuO/CHA material that does not contain a zirconia or alumina sol represented with a diamond. The catalyst material of Example 5 (6% $ZrO_2$/3.25% CuO/CHA) is represented by a triangle and the catalyst material of Example 6 (6% $Al_2O_3$/3.25% CuO/CHA) is represented by a square. As shown in the figure, the CHA materials modified with zirconia or alumina outperform the unmodified material at higher temperature.

Example 7: 8% $ZrO_2$/2% $Y_2O_3$ on 4.4% CuO/CHA 0.5 Kg of commercially available 60/40 ZrO2/Y2O3 mixed sol is dispersed in 41 kg of DI water which contains 0.17 kg 90% acetic acid. 2.2 Kg of commercially available nitric acid based zirconia sol with $ZrO_2$ content of 15% by weight (ZSL-15N available from Daiichi Kigenso Kagaku Kogyo Co., Ltd) is added to the dispersion created in previous step by mixing at room temperature. 5.4 Kg of spray dried 4.91% CuO/CHA is added to the resulting dispersion, producing 8% $ZrO_2$/2% $Y_2O_3$/4.40% CuO/CHA. The product mixture from the previous step is then recycled through an in-line homogenizer @ 50 Hz to break large agglomerates to D90<14 µm. The resulting slurry is then coated onto 400/4 cordierite substrate, dried and calcined at 450° C. to achieve a dry gain of 2.75 g/in³.

The use of the terms "a" and "an" and "the" and similar referents in the context of describing the materials and methods discussed herein (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A catalyst composition suitable for use as a selective catalytic reduction catalyst, comprising: small-pore molecular sieve particles having a pore structure and a maximum ring size of eight tetrahedral atoms and impregnated with a promoter metal, and metal oxide particles dispersed within the small-pore molecular sieve particles and external to the pore structure of the small-pore molecular sieve particles, wherein the metal oxide particles comprise one or more oxides of a transition metal or lanthanide of Group 3 or Group 4 of the Periodic Table.

2. The catalyst composition of claim 1, wherein the metal oxide particles comprise a metal oxide selected from the group consisting of zirconia, alumina, ceria, hafnia, yttria, and combinations thereof.

3. The catalyst composition of claim 1, wherein the metal oxide particles comprise zirconia.

4. The catalyst composition of claim 1, wherein the metal oxide particles have an average particle size in the range of about 10 nm to about 500 nm.

5. The catalyst composition of claim 1, wherein the metal oxide particles have a $D_{10}$ particle size greater than ten times larger than a pore opening of the molecular sieve.

6. The catalyst composition of claim 1, wherein the metal oxide particles have a $D_{10}$ particle size of about 10 nm or greater.

7. The catalyst composition of claim 1, wherein the small-pore molecular sieve has a d6r unit.

8. The catalyst composition of claim 1, wherein the small-pore molecular sieve has a structure type selected from AEI, AFT, AFX, CHA, EAB, ERI, KFI, LEV, LTN, MSO, SAS, SAT, SAV, SFW, and TSC.

9. The catalyst composition of claim 1, wherein the promoter metal is selected from the group consisting of Cu, Co, Ni, La, Mn, Fe, V, Ag, Ce, Nd, Pr, Ti, Cr, Zn, Zn, Nb, Mo, Hf, Y, W, and combinations thereof.

10. The catalyst composition of claim 1, wherein the small-pore molecular sieve has the CHA structure type.

11. The catalyst composition of claim 1, wherein the promoter metal comprises Cu or Fe or combinations thereof.

12. The catalyst composition of claim 1, wherein the promoter metal is present in an amount in the range of about 1 to about 10% by weight, based on the total weight of the molecular sieve.

13. The catalyst composition of claim 1, wherein the promoter metal is present in an amount in the range of about 2 to about 5% by weight, based on the total weight of the molecular sieve.

14. The catalyst composition of claim 1, wherein the metal oxide is present in an amount in the range of about 1 to about 15% by weight, on an oxide basis, based on the total weight of the washcoat.

15. A catalyst article comprising a substrate selected from a flow-through monolith, a wall-flow filter, a foam, or a mesh, wherein a catalyst composition of claim 1 is adhered as a washcoat layer on the substrate.

16. The catalyst article of claim 15, wherein the washcoat is disposed on a flow-through monolith or a wall-flow filter.

17. The catalyst article of claim 15, wherein the catalyst article is characterized by an $N_2O$ make that is at least 10% by weight lower as compared to a catalyst article comprising a washcoat with the same catalyst composition at the same loading but without metal oxide particles dispersed within the small-pore molecular sieve particles.

18. A method for selectively reducing nitrogen oxides ($NO_x$), the method comprising contacting an exhaust gas stream containing $NO_x$ with the catalyst article of claim 15.

19. The method of claim 18, wherein the amount of $N_2O$ produced as a byproduct is reduced as compared to the amount of $N_2O$ produced in a method using a catalyst article comprising a washcoat with the same catalyst composition at the same loading but without metal oxide particles dispersed within the small-pore molecular sieve particles.

20. An exhaust gas treatment system comprising the catalyst article of claim 15 downstream from an engine and an injector that adds a reductant to the exhaust gas stream.

21. A method of preparing a catalyst composition, the method comprising:
dissolving a salt of at least one promoter metal in an aqueous-based metal oxide sol, wherein the salt of the at least one promoter metal dissociates in the aqueous-based metal oxide sol to form an aqueous-based metal salt/metal oxide sol mixture, wherein the metal oxide particles comprise one or more oxides of a transition metal or lanthanide of Group 3 or Group 4 of the Periodic Table;
treating ammonium or proton exchanged small-pore molecular sieve particles having a pore structure and a maximum ring size of eight tetrahedral atoms with the aqueous-based metal salt/metal oxide sol mixture to allow impregnation of the promoter metal into the pore structure of the small-pore molecular sieve; and
drying and calcining the treated small-pore molecular sieve particles to form the catalyst composition, wherein the catalyst composition comprises the small-pore molecular sieve particles impregnated with the promoter metal, and metal oxide particles dispersed within the small-pore molecular sieve particles and external to the pore structure of the small-pore molecular sieve particles.

22. The method of claim 21, wherein the metal oxide is selected from the group consisting of zirconia, alumina, ceria, hafnia, yttria, and combinations thereof.

23. The method of claim 21, wherein the metal oxide comprises zirconia.

24. The method of claim 21, wherein the metal oxide sol has an average particle size in the range of about 10 nm to about 500 nm.

25. The method of claim 21, wherein the metal oxide sol has a $D_{10}$ particle size greater than ten times larger than a pore opening of the molecular sieve.

26. The method of claim 21, wherein the metal oxide sol has a $D_{10}$ particle size of about 10 nm or greater.

27. The method of claim 21, wherein the promoter metal is selected from the group consisting of Cu, Co, Ni, La, Mn, Fe, V, Ag, Ce, Nd, Pr, Ti, Cr, Zn, Zn, Nb, Mo, Hf, Y, W, and combinations thereof.

28. The method of claim 21, wherein the metal oxide sol is selected from the group consisting of zirconyl hydroxide sols, nano-sized hydrous zirconia sols, alumina sols, zirconia-yttria sols, zirconia-alumina sols, zirconia-ceria sols, organo-zirconium sols, and mixtures thereof.

29. The method of claim 21, wherein metal oxide particles do not enter the pore structure of the small-pore molecular sieve.

30. The method of claim 21, wherein the small-pore molecular sieve has a d6r unit.

31. The method of claim 21, wherein the small-pore molecular sieve has a structure type selected from AEI, AFT, AFX, CHA, EAB, ERI, KFI, LEV, LTN, MSO, SAS, SAT, SAV, SFW, and TSC.

32. The method of claim 21, wherein the small-pore molecular sieve has the CHA crystal structure.

33. The method of claim 21, wherein the promoter metal comprises Cu, Fe, or a combination thereof.

34. The method of claim 21, further comprising the steps of mixing the catalyst composition with water to form a washcoat slurry; applying the washcoat slurry to a substrate to form a washcoat coating thereon; and drying and calcining the substrate to form a catalytic article.

35. The method of claim 34, further comprising adding a water soluble metal oxide compound to the washcoat slurry to increase the total metal oxide content thereof.

* * * * *